(12) United States Patent
Maeda et al.

(10) Patent No.: US 12,377,543 B2
(45) Date of Patent: Aug. 5, 2025

(54) PATH PLANNING DURING EXECUTION OF ROBOT CONTROL

(71) Applicant: KABUSHIKI KAISHA YASKAWA DENKI, Kitakyushu (JP)

(72) Inventors: Takahiro Maeda, Fukuoka (JP); Motoharu Maruno, Fukuoka (JP); Yuta Arita, Fukuoka (JP)

(*) Notice: Subject to any disclaimer, the term of this patent is extended or adjusted under 35 U.S.C. 154(b) by 195 days.

(21) Appl. No.: 18/164,631

(22) Filed: Feb. 6, 2023

(65) Prior Publication Data

US 2023/0249347 A1 Aug. 10, 2023

(30) Foreign Application Priority Data

Feb. 10, 2022 (JP) ................. 2022-019414

(51) Int. Cl.
*B25J 9/16* (2006.01)
(52) U.S. Cl.
CPC ........... *B25J 9/1666* (2013.01); *B25J 9/1671* (2013.01)
(58) Field of Classification Search
CPC ............................. B25J 9/1666; B25J 9/1671
See application file for complete search history.

(56) References Cited

U.S. PATENT DOCUMENTS

| | | | |
|---|---|---|---|
| 8,600,554 | B2 | 12/2013 | Jing et al. |
| 2006/0069464 | A1 | 3/2006 | Nagatsuka et al. |
| 2016/0016311 | A1 | 1/2016 | Konolige et al. |
| 2016/0346926 | A1 | 12/2016 | Matthias et al. |
| 2018/0001472 | A1 | 1/2018 | Konidaris et al. |
| 2018/0236657 | A1 | 8/2018 | Kuwahara et al. |
| 2019/0375104 | A1 | 12/2019 | Moriya et al. |
| 2020/0117212 | A1 | 4/2020 | Tian |
| 2021/0008720 | A1 | 1/2021 | Clucas |
| 2021/0323157 | A1 | 10/2021 | Usui et al. |

(Continued)

FOREIGN PATENT DOCUMENTS

| | | |
|---|---|---|
| CN | 101512453 | 8/2009 |
| CN | 107206592 | 9/2017 |

(Continued)

OTHER PUBLICATIONS

Albert J Wavering, "Manipulator primitive level task decomposition NBS TN 1256", NIST, National Institute of Standards and Technology (NIST), Retrieved from the Internet: URL: https://nvlpubs.nist.gov/nistpubs/Legacy/TN/nbstechnicalnote1256.pdf [retrieved on Oct. 1, 1988], Oct. 1, 1988, P1-P60.

(Continued)

*Primary Examiner* — Thomas E Worden
*Assistant Examiner* — Christopher A Buksa
(74) *Attorney, Agent, or Firm* — SOEI PATENT & LAW FIRM

(57) ABSTRACT

A robot system include: a robot; and circuitry configured to: sequentially call a plurality of commands representing an operation path of the robot including an undetermined section; generate an additional path for the undetermined section; and operate the robot based on a command called from the plurality of commands and the additional path, wherein the circuitry is configured to generate the additional path based on surrounding environment information of the robot during operation of the robot based on the called command.

20 Claims, 18 Drawing Sheets

(56) References Cited

U.S. PATENT DOCUMENTS

| | | |
|---|---|---|
| 2022/0001537 A1 | 1/2022 | Hashiguchi et al. |
| 2024/0009845 A1* | 1/2024 | Floyd-Jones .......... B25J 9/1697 |
| 2024/0208064 A1 | 6/2024 | Usui et al. |

FOREIGN PATENT DOCUMENTS

| | | |
|---|---|---|
| CN | 108453702 | 8/2018 |
| CN | 112247993 | 1/2021 |
| EP | 1901150 | 3/2008 |
| EP | 3932625 | 1/2022 |
| JP | S61-272803 | 12/1986 |
| JP | S62-157911 | 7/1987 |
| JP | 2000-020117 | 1/2000 |
| JP | 2005-025668 | 1/2005 |
| JP | 2012-187697 | 10/2012 |
| JP | 2022-504593 | 1/2022 |
| WO | 2008/031664 | 3/2008 |
| WO | 2016/122840 | 8/2016 |
| WO | 2020/073681 | 4/2020 |

OTHER PUBLICATIONS

Panasonic, "Industrial Robot Controllers", Retrieved from the Internet: URL: https://pdfcoffee.com/om1009082e17-yaseries-operation-compressed-pdf-free.html [retrieved on Jun. 15, 2023], Jul. 1, 2013.
Extended Search Report in corresponding European Application No. 23154670.6 dated Jun. 23, 2023.
Office Action issued in Japanese Patent Application No. P2022-019414, dated Nov. 14, 2023 (with English partial translation).
Office Action issued in Chinese Patent Application No. 202410801147.4, dated Nov. 16, 2024 (with English partial translation).

* cited by examiner

*Fig.4*

C1 ~ MoveL (·················)
C2 ~ MoveS (················)
C3 ~ MoveL (················)
C4 ~ MoveL (···············)
C5 ~ MoveAuto (················)
C6 ~ MoveL (················)
C7 ~ MoveS (···············)
C8 ~ MoveJ (················)
C9 ~ MoveAuto (················)
···

PATH PLANNING DURING EXECUTION OF ROBOT CONTROL

CROSS-REFERENCE TO RELATED APPLICATIONS

This application is based upon and claims the benefit of priority from Japanese Patent Application No. 2022-019414, filed on Feb. 10, 2022. The entire contents of which are incorporated herein by reference.

BACKGROUND

Field

The present disclosure relates to a robot system and a control method.

Description of the Related Art

Japanese Unexamined Patent Publication No. 2000-20117 discloses a method for planning a motion path of a robot in which the robot and an obstacle in a work environment do not interfere with each other when start and goal arrangements of the robot are given by using geometric model means on a computer describing geometric shapes of the robot and the work environment and their arrangements and interference inspection means on the computer for inspecting interference between models.

SUMMARY

Disclosed herein is a robot system. The robot system may include: a robot; and circuitry configured to: sequentially call a plurality of commands representing an operation path of the robot including an undetermined section; generate an additional path for the undetermined section; and operate the robot based on a command called from the plurality of commands and the additional path, wherein the circuitry is configured to generate the additional path based on surrounding environment information of the robot during operation of the robot based on the called command.

Additionally, a control method is disclosed herein. The control method may include: sequentially calling a plurality of commands representing an operation path of a robot including an undetermined section; generating an additional path for the undetermined section; and operating the robot based on a command called from the plurality of commands and the additional path, wherein the additional path is generated based on surrounding environment information of the robot during the robot is operated based on the called command.

BRIEF DESCRIPTION OF THE DRAWINGS

FIG. 4 is a diagram illustrating a plurality of example commands.

DETAILED DESCRIPTION

In the following description, with reference to the drawings, the same reference numbers are assigned to the same components or to similar components having the same function, and overlapping description is omitted.

Robot System

Figure 1:
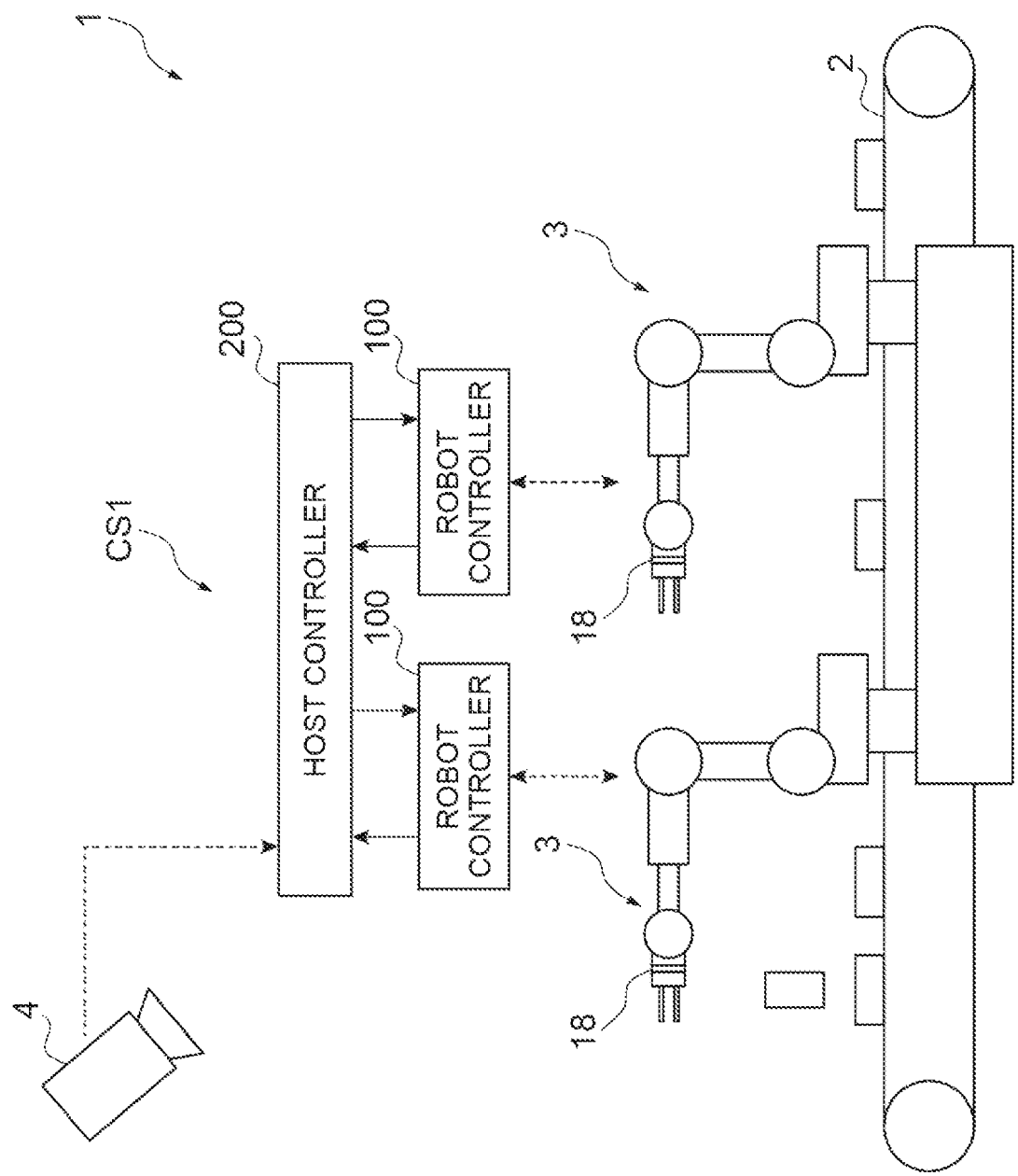
FIG. 1 is a schematic diagram illustrating an example configuration of a robot system.

A robot system 1 illustrated in FIG. 1 is a system for producing workpieces or the like by a plurality of machines including one or more robots. What the robot system 1 causes the plurality of machines to execute is not limited to production of workpiece or the like. As an example, the robot system 1 comprises a conveyor 2, a plurality of robots 3, and a control system CS1.

The conveyor 2 conveys workpieces by power of an electric motor or the like, for example. Examples of the conveyor 2 include a belt conveyor and a roller conveyor. Each of the plurality of robots 3 performs an operation on a workpiece transported by the conveyor 2. Examples of the operation on the workpiece include assembly of a workpiece (for example, a sub-part) to another workpiece (for example, a base part) conveyed by the conveyor 2, fastening (for example, bolt fastening) and joining (for example, welding) of parts in a workpiece conveyed by the conveyor 2, and the like.

Figure 2:
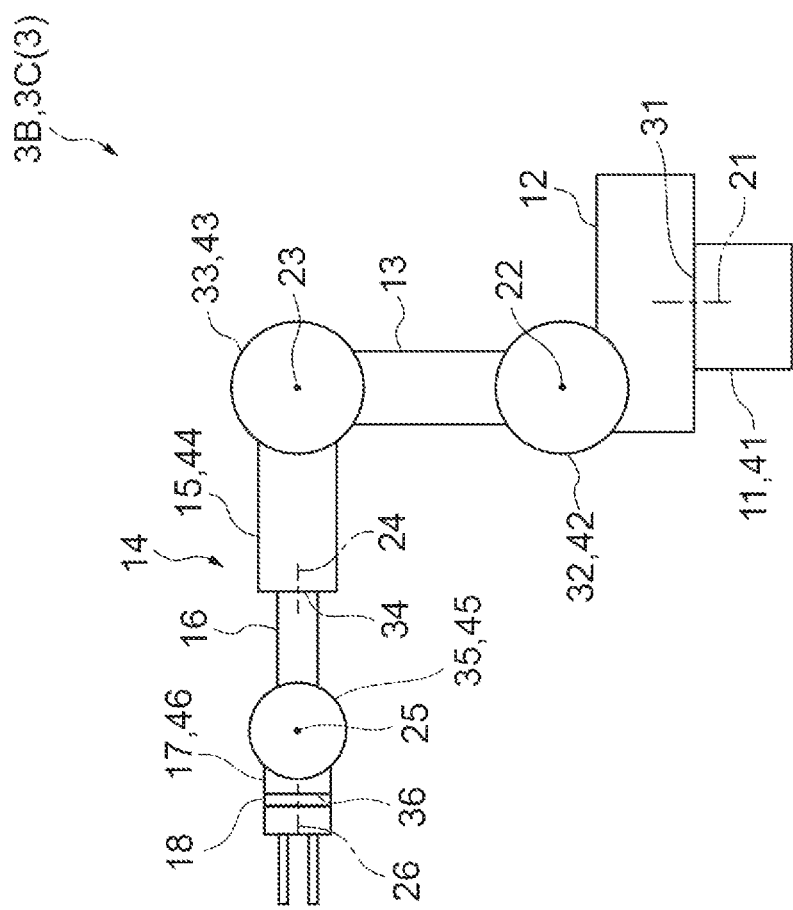
FIG. 2 is a schematic diagram illustrating an example configuration of a robot.

FIG. 2 is a schematic diagram illustrating the configuration of the robot 3. The robot 3 illustrated in FIG. 2 is a six-axis vertical articulated robot with a base 11, a pivoting portion 12, a first arm 13, a second arm 14, a third arm 17, a tip portion 18, and actuators 41, 42, 43, 44, 45, 46. The base 11 is placed around the conveyor 2. The pivoting portion 12 is mounted on the base 11 to pivot about a vertical axis 21. The first arm 13 is connected to the pivoting portion 12 to swing about an axis 22 that intersects (e.g., is orthogonal to) the axis 21 and extends away from the axis 22. The intersection includes a case where there is a twisted relationship such as so-called three-dimensional intersection. The same applies to the following description.

The second arm 14 is connected to the tip portion of the first arm 13 to swing about an axis 23 that is substantially parallel to the axis 22 and extends away from the axis 23. The second arm 14 includes an arm base 15 and an arm end 16. The arm base 15 is connected to the tip portion of the first arm 13. The arm end 16 is connected to the tip portion of the arm base 15 to pivot about an axis 24 that intersects (e.g., is orthogonal to) the axis 23 and extends along the axis 24 in a direction away from the arm base 15.

The third arm 17 is connected to the tip portion of the arm end 16 so as to swing about an axis 25 that intersects (e.g., is orthogonal to) the axis 24. The tip portion 18 is connected to the tip portion of the third arm 17 so as to pivot about an axis 26 that intersects (e.g., is orthogonal to) the axis 25.

As described above, the robot 3 includes a joint 31 connecting the base 11 and the pivoting portion 12, a joint 32 connecting the pivoting portion 12 and the first arm 13, a joint 33 connecting the first arm 13 and the second arm 14, a joint 34 connecting the arm base 15 and the arm end 16 in the second arm 14, a joint 35 connecting the arm end 16 and the third arm 17, and a joint 36 connecting the third arm 17 and the tip portion 18.

The actuators 41, 42, 43, 44, 45, 46 include, for example, an electric motor and a speed reducer and respectively drive joints 31, 32, 33, 34, 35, 36. For example, the actuator 41 pivots the pivoting portion 12 about the axis 21. The actuator 42 swings the first arm 13 about the axis 22. The actuator 43 swings the second arm 14 about the axis 23. The actuator 44 pivots the arm end 16 about the axis 24. The actuator 45 swings the third arm 17 about the axis 25. The actuator 46 pivots the tip portion 18 about the axis 26.

The configuration of the robot 3 can be modified. For example, the robot 3 may be a seven-axis redundant robot in which a one-axis joint is further added to the six-axis vertical articulated robot, or may be a so-called SCARA (Selective Compliance Assembly Robot Arm) type multi-joint robot.

Returning to FIG. 1, the control system CS1 controls a plurality of machines including a plurality of robots 3. The control system CS1 is configured to perform: sequentially calling a plurality of commands representing an operation path of the robot 3 including an undetermined section; generating an additional path for the undetermined section; and operating the robot 3 based on a called command and the additional path. Further, the control system CS1 is configured to generate the additional path based on surrounding environment information of the robot during operation of the robot based on a command called from the plurality of commands.

The operation path represents, for example, a movement path of a part of the robot 3 (for example, the tip portion 18). The operation path may represent a transition of the position and posture of the tip portion 18. The operation path includes a plurality of sections. Each of the plurality of sections is between two via points of the operation path. The plurality of sections include a plurality of determined sections and one or more undetermined sections. Each of the plurality of determined sections is a section in which a movement path between two via points (for example, a movement path of the tip portion 18) is determined. Each of the one or more undetermined sections is a section in which a path between two via points is not determined.

The control system CS1 generates the additional path for the undetermined section based on the surrounding environment information. The additional path represents a path between two via points in the undetermined section.

If the operation path is partially generated so that essential sections (for example, sections essential for a work of the robot such as production of a workpiece) are prepared in advance and set as the plurality of determined sections, the remaining undetermined section is compensated by the control system CS1, thereby facilitating the operation teaching to the robot 3.

Furthermore, with the control system CS1, the additional path is generated based on the surrounding environment information after the robot 3 starts an operation based on a plurality of commands, and an operation by the robot 3 is continued based on the generated additional path. Therefore, the robot 3 may perform an operation flexibly corresponding to a change in the surrounding environment.

Hereinafter, an example configuration of the control system CS1 will be described in more detail. The control system CS1 has a plurality of controllers 100 and a host controller 200. The plurality of controllers 100 respectively control each of the plurality of robots 3 based on commands from the host controller 200. The host controller 200 transmits work commands to each of the plurality of controllers 100 so as to cause the plurality of robots 3 to cooperatively perform a series of work. Each of the plurality of controllers 100 controls a corresponding robot 3 based on the work command.

In the control of the robot 3 based on the work command, the controller 100 executes: sequentially calling a plurality of commands; generating the additional path for each of one or more undetermined sections; and operating the robot 3 based on the called command and the additional path. The controller 100 generates an additional path based on the surrounding environment information when the robot 3 is operated based on one command. Hereinafter, configurations of the controller 100 and the host controller 200 will be described in more detail.

Controller

Figure 3:
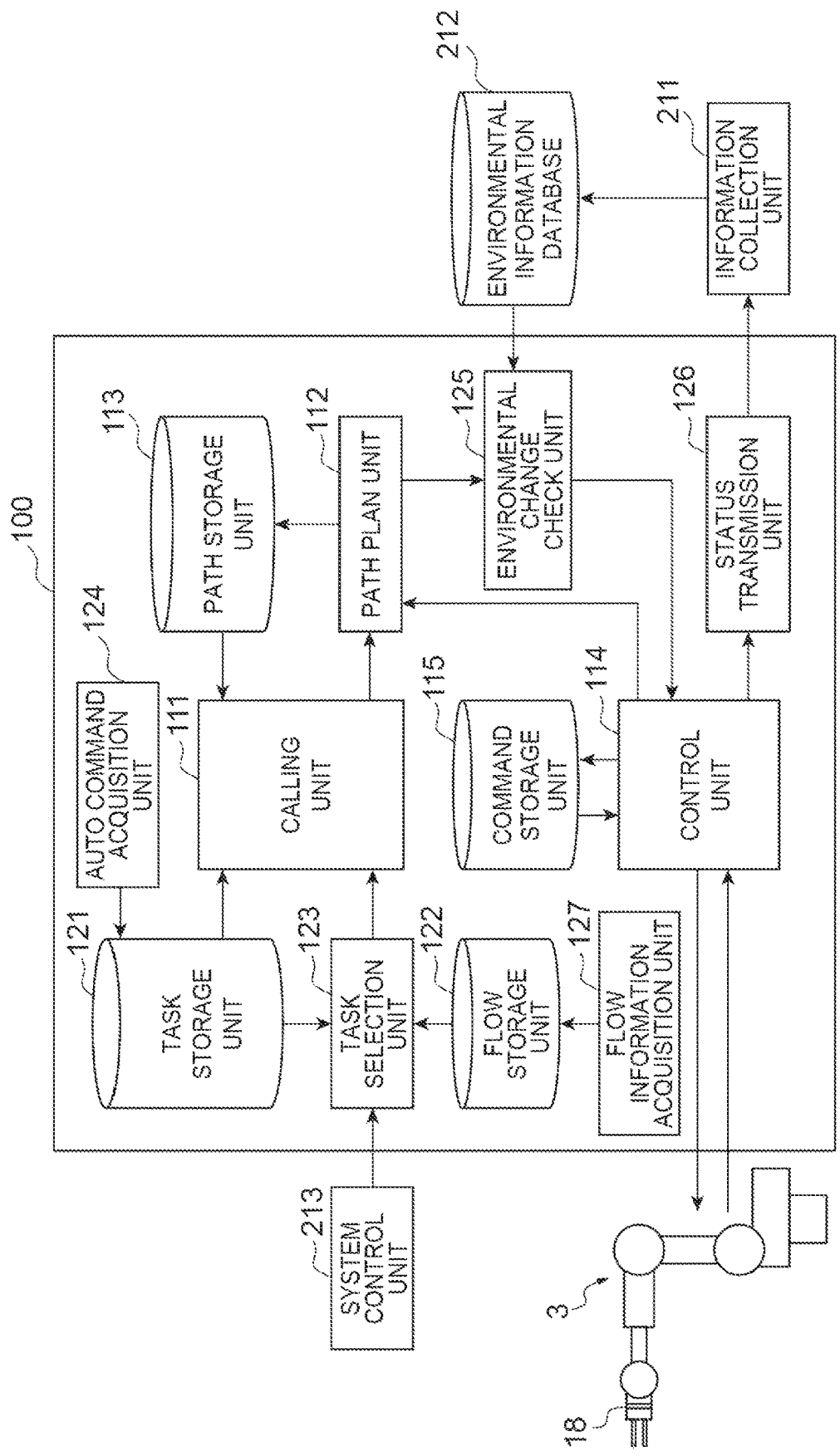
FIG. 3 is a block diagram illustrating an example functional configuration of a controller.

FIG. 3 is a block diagram illustrating an example functional configuration of the controller 100. As illustrated in FIG. 3, the controller 100 includes a calling unit 111, a path plan unit 112, a path storage unit 113, and a control unit 114 as functional components (hereinafter referred to as "functional blocks").

The calling unit 111 is configured to sequentially call a plurality of commands representing an operation path of the robot 3. The plurality of commands may be stored in advance by the controller 100. For example, the controller 100 may store in advance an operation program in which a plurality of commands are arranged in the order in which they are executed. The calling unit 111 may sequentially fetche a plurality of commands from the operation program stored in the controller 100. Fetching means reading data.

The plurality of commands may be sent from a cloud to the controller 100. The calling unit 111 may sequentially fetche a plurality of commands from a reception buffer that temporarily stores the data received from the cloud computer.

The path plan unit 112 is configured to generate the additional path for the undetermined section. When the operation path includes a plurality of undetermined sections, the path plan unit 112 generates an additional path for each of the plurality of undetermined sections.

As an example, the plurality of commands include a move command and an auto command. The plurality of commands may include a plurality of move commands and one or more auto commands.

The move command includes information on the via point of the operation path. The via point defines at least the location of the tip portion 18. The via point may define the position and posture of the tip portion 18. The via point may define the angles of the joints 31, 32, 33, 34, 35, 36 instead of defining the position and posture of the tip portion 18 itself. Determining the angles of the joints 31, 32, 33, 34, 35, 36 also determines the position and orientation of the tip portion 18. The via point of the move command may be a teaching point taught by offline teaching, online teaching, or the like by an operator.

The move command may further include path definition information. The path definition information is information for defining a path in a section up to the via point of the move command and setting the section as the determined section. Hereinafter, the section up to the via point of the move command is referred to as a "move section", and the path of the move section is referred to as a "move section path". For example, the path information represents a path determining condition for uniquely determining a move section path. Examples of the path determining condition include interpolation of move section by a straight line (linear interpolation) and interpolation of move section by an S-shaped curve (S-shaped interpolation).

Each of the one or more auto commands includes information of a via point of an operation path that is an arrival point of an undetermined section. Each of the one or more auto commands may further include condition information representing a generation condition for generating the additional path. Examples of the generation condition include a path determining condition for an additional command to be described later, a moving speed condition in the additional path, an accelerating condition in the additional path, a decelerating condition in the additional path, a posture condition of the tip portion 18 in the additional path, and a condition as to whether reuse of a generated additional path is permitted when the surrounding environment information does not change. Similarly to the via point of the move command, the via point of the auto command may be a teaching point taught by offline teaching, online teaching, or the like by the operator.

FIG. 4 is a diagram illustrating a plurality of commands. Commands C1, C2, C3, C4, C5, C6, C7, C8, C9 are illustrated in FIG. 4. Commands C1, C2, C3, C4, C6, C7, C8 are move command, and commands C5, C9 are auto command. In FIG. 4, the via point of each command is input as an argument in parentheses.

In the commands C1, C2, C3, C4, C6, C7, C8, one alphabet attached after "Move" corresponds to an example of path information. For example, "L" indicates that the position and posture of the tip portion 18 at the start point and the position and posture of the tip portion 18 at the end point are complemented by a straight line. "S" indicates that the position and posture of the tip portion 18 at the start point and the position and posture of the tip portion 18 at the end point are complemented by an S-shaped curve. "J" indicates that the angles of the joints 31, 32, 33, 34, 35, 36 at the start point and the angles of the joints 31, 32, 33, 34, 35, 36 at the end point are complemented by a straight line.

In the commands C5, C9, "Auto" attached after "Move" indicates that the commands are auto commands.

As illustrated in FIG. 4, according to a plurality of commands including a move command and an auto command, an operation path including a determined section (move section) corresponding to the move command and an undetermined section corresponding to the auto command is represented. Referring back to FIG. 3, the path plan unit 112 generates an additional path for the undetermined section corresponding to the auto command. For example, the path plan unit 112 generates an additional path from a via point (start point) immediately before a via point (arrival point) of the auto command to the arrival point. In a case where the auto command is at the head of a plurality of commands or the like, the path plan unit 112 may generate an additional path using the current position of the tip portion 18 of the robot 3 as a starting point.

The control unit 114 is configured to operate the robot 3 based on the command called by the calling unit 111 and the additional path. For example, the control unit 114 operates the robot 3 along a series of operation paths including a plurality of move section paths respectively corresponding to a plurality of move commands and one or more additional paths respectively corresponding to one or more auto commands.

The control unit 114 may not operate the robot 3 so as to completely conform to each of the plurality of move section paths and the one or more additional paths, and may operate the robot 3 so as to at least partially conform to each of the plurality of move section paths and the one or more additional paths. For example, the control unit 114 may operate the robot 3 at least partially along each of the plurality of move section paths and the one or more additional paths, but not through one or more via points of the operation path.

The path plan unit 112 generates an additional path based on the surrounding environment information of the robot 3 when the control unit 114 is operating the robot 3 based on one command. For example, when the control unit 114 is operating the robot 3 based on the move command, the path plan unit 112 generates an additional path to the arrival point in the undetermined section corresponding to the auto command based on the auto command after the move command and the surrounding environment information. For example, the path plan unit 112 generates an additional path when the control unit 114 is operating the robot 3 along the move section path corresponding to the move command. The path plan unit 112 may generate an additional path when the control unit 114 is operating the robot 3 along a move section path corresponding to a move command that is two or more commands before the auto command.

The path plan unit 112 may generate an additional path for the undetermined section corresponding to the subsequent auto command based on the subsequent auto command and the surrounding environment information when the control unit 114 is operating the robot 3 based on the preceding auto command. The path plan unit 112 may generate an additional path for an undetermined section corresponding to a subsequent auto command based on the subsequent auto command and surrounding environment information when the control unit 114 is operating the robot 3 based on an auto command that is two or more commands before the subsequent auto command.

The path plan unit 112 may generate two or more new move commands defining the additional path based on the surrounding environment information. Hereinafter, two or more new move commands that define the additional path are referred to as "two or more additional commands". A path in which two or more move section paths respectively corresponding to two or more additional commands are connected may be the additional path.

Figure 5:
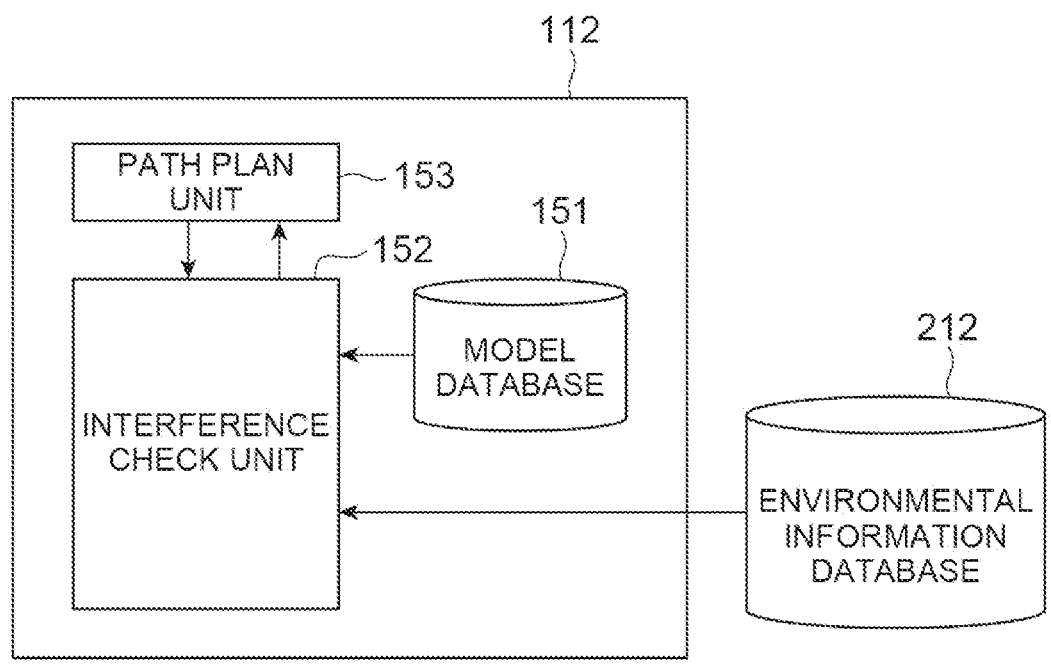
FIG. 5 is a block diagram illustrating an example configuration of a path plan unit.

For example, as illustrated in FIG. 5, the path plan unit 112 includes a model database 151, an interference check unit 152, and a path generation unit 153. The model database 151 stores model information of the conveyor 2 and the plurality of robots 3. The model database 151 may further store model information of the conveyor 2 and peripheral objects of the plurality of robots 3. The model information includes numerical information specifying a structure and a size.

The interference check unit 152 is configured to simulate the operation of the conveyor 2 and the robots 3 to verify that the robots 3 do not interfere with the peripheral object present in the surrounding environment and robots themselves. For example, the interference check unit 152 simulates the operation of the robot 3 based on the additional path based on model information stored by the model database 151 and surrounding environment information stored by an environmental information database 212, and confirms whether the robot 3 interferes with the peripheral object. Interference means that the robot 3 overlaps with the peripheral object in the simulation space. When interference occurs in the simulation space, a collision between the robot 3 and the peripheral object occurs in the real space.

The interference check unit 152 may calculate a series of control commands generated by the control unit 114 based on the two or more commands including the two or more additional commands, and simulate the operation of the robot 3 based on the calculated series of control commands.

The path generation unit 153 is configured to generate an additional path. For example, the path generation unit 153 first interpolates the start point and the arrival point with a straight line to tentatively generate an additional path, and causes the interference check unit 152 to simulate the motion of the robot 3 based on the tentatively generated additional path. As a result of the simulation by the interference check unit 152, if it is determined that there is interference between the robot 3 and the peripheral object, the path generation unit 153 randomly generates a via point that does not interfere with the peripheral object and adds the via point between the start point and the arrival point. Thereafter, the generation and addition of the via point are repeated until the interference between the robot 3 and the peripheral object does not occur due to the additional path connecting the starting point, the generated one or more via points, and the arrival point. Thereafter, the path generation unit 153 generates two or more additional commands having the added one or more via points and the arrival point as via points.

As described above, the interference check unit 152 confirms that the robot 3 does not interfere with the peripheral object in the additional path generated by the path plan unit 112. Therefore, when the robot 3 does not interfere with the peripheral object, the control unit 114 operates the robot 3 based on the additional path generated by the path plan unit 112.

Returning to FIG. 3, the path plan unit 112 stores the generated two or more additional paths in the path storage unit 113. For example, the path plan unit 112 stores the generated two or more additional commands in the path storage unit 113. The path plan unit 112 may cause a simulation device in communication with the controller 100 to generate the additional path. For example, the path plan unit 112 may request the simulation device to generate the additional path by specifying a start point and an arrival point. Upon receiving the request to generate the additional path, the simulation device generates the additional path based on the surrounding environment information. In this way, causing another device to generate the additional path based on the surrounding environment information is also included in the generation of the additional path based on the surrounding environment information.

When the path storage unit 113 stores two or more additional commands, the calling unit 111 sequentially calls the two or more additional commands. The control unit 114 operates the robot 3 based on the two or more additional commands called by the calling unit 111. For example, the control unit 114 moves the robot 3 at least partially along each of the two or more move section paths corresponding to the two or more additional commands.

The path plan unit 112 may generate two or more additional commands based on the auto command and additional commands based on the auto command and the surrounding environment information. the calling unit 111 For example, the path plan unit 112 generates an additional path from a via point (start point) immediately before a via point (arrival point) of the auto command called by the calling unit 111 to the arrival point.

The calling unit 111 may store the called two or more commands in a command storage unit 115. The calling unit 111 may store two or more commands in the command storage unit 115, including two or more additional commands. For example, when the calling unit 111 calls the auto command, the calling unit 111 may call, from the path storage unit 113, two or more additional commands stored in the path storage unit 113 by the path plan unit 112 based on the auto command and store the additional commands in the command storage unit 115.

The control unit 114 may operate the robot 3 based on two or more commands stored by the command storage unit 115. For example, the control unit 114 may generate a series of control commands for the robot 3 based on two or more commands stored by the command storage unit 115 and operate the robot 3 based on the series of control commands. For example, the control unit 114 may generate the series of control commands for smoothing the operation path based on the two or more commands stored in the command storage unit. For example, the control unit 114 may generate a series of speed patterns including acceleration and deceleration based on two or more commands stored by the command storage unit 115, and operate the robot 3 based on the series of speed patterns. For example, the control unit 114 repeatedly executes, in a predetermined control cycle, calculation of a target angle of the joints 31, 32, 33, 34, 35, 36 by inverse kinematics calculation based on a series of speed patterns with respect to the position and posture of the tip portion 18, and causing the angle of the joints 31, 32, 33, 34, 35, 36 to follow the target angle.

The path plan unit 112 may start the generation of the additional path at a timing at which the generation of the additional path is completed before the operation corresponding to the move command immediately preceding the auto command is completed. For example, the path plan unit 112 may determine a start timing of generation of the additional path based on the auto command subsequent to the move command, so that the generation of the additional path is completed before an operation based on the move command is completed. For example, the path plan unit 112 may generate an additional path at a timing at which two or more additional commands can be stored in the path storage unit 113 before the operation corresponding to the move command immediately preceding the auto command is completed. Hereinafter, an operation corresponding to the move command immediately before the auto command is referred to as a "preceding operation".

For example, the path plan unit 112 may start generation of the additional path at a timing before a predetermined generation margin time from the completion prediction timing of the preceding operation. The generation margin time is set to be equal to or longer than the time for generating the additional path. The generation margin time may be set to be equal to or longer than the total time of the time for generating generate the additional path and the time for generating the control command.

Examples of the completion prediction timing of the preceding operation include the timing of transition from the preceding operation to the operation based on the auto command, the deceleration start timing before transition from the preceding operation to the operation based on the auto command, and the like.

The calling unit 111 may modify a size of the command storage unit 115 to change number of commands to be stored in the command storage unit 115 such that an expected length of time of an operation corresponding to two or more commands stored in the command storage unit 115 exceeds (become longer than) at least a length of time for generating the additional path by the path plan unit 112. For example, when the expected time is shorter than the time for generating the additional path, the calling unit 111 may shorten the calling cycle of the command and increase the number of commands stored by the command storage unit 115.

Figure 6:
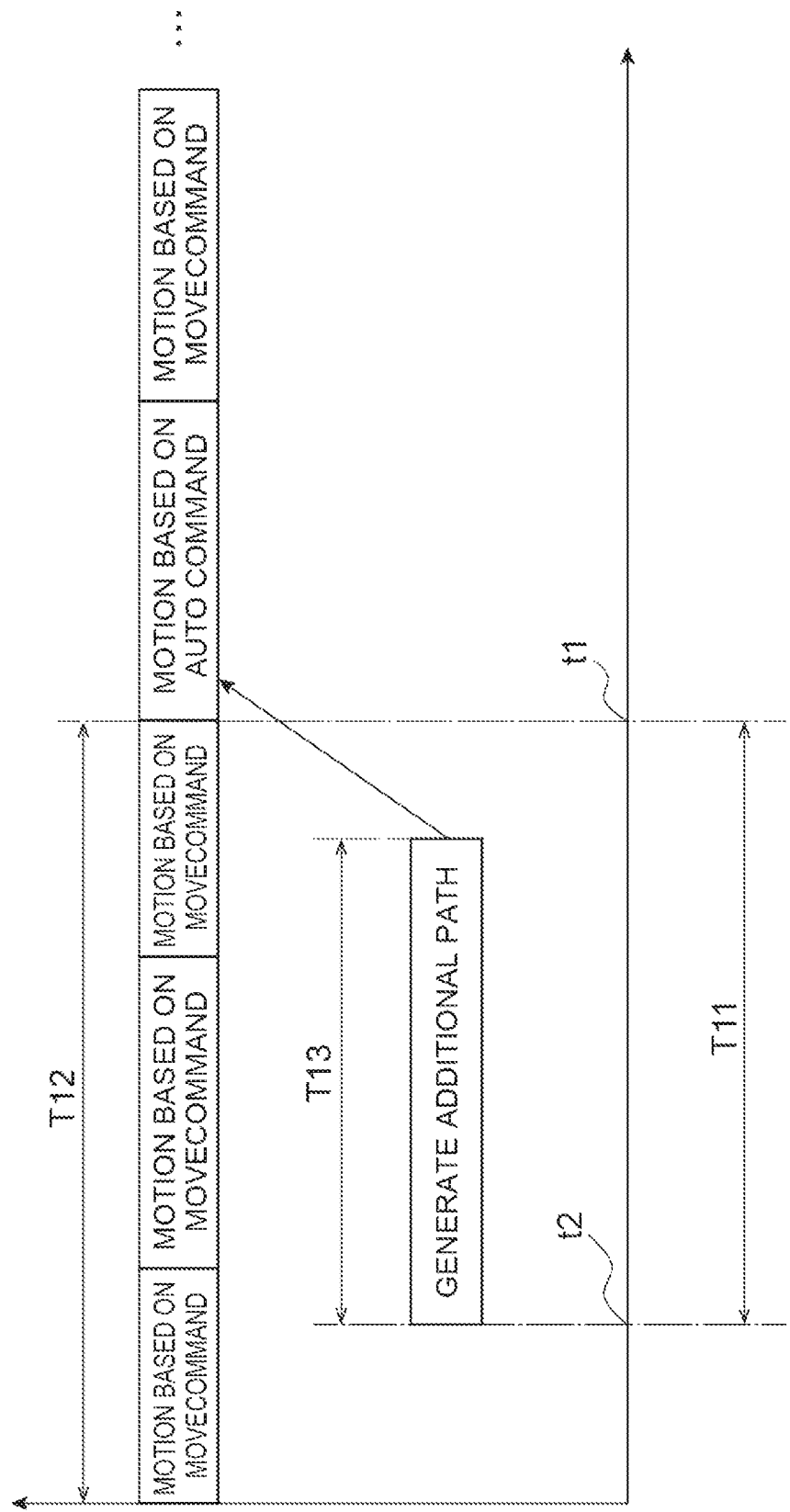
FIG. 6 is a timing chart illustrating a relationship between an operation period of a robot and a generation period of an additional path.

FIG. 6 is a timing chart illustrating a relationship between an operation period of a robot and a generation period of an additional path, in which a horizontal axis represents an elapse of time. As illustrated in FIG. 6, the path plan unit 112 starts to generate an additional path in a start timing t2 that is a generation margin time T11 before a completion prediction timing t1 of the preceding operation. The generation margin time T11 is greater than or equal to a generation time T13 of the additional path. Therefore, if the generation of the additional path is started at the generation margin time T11, the generation of the additional path can be completed before the completion prediction timing t1 at which the preceding operation is completed.

In FIG. 6, an expected time T12 of the motion corresponding to two or more commands stored by the command storage unit 115 is longer than the generation margin time T11. For this reason, there is a margin of time before the preceding operation is completed after the auto command is fetched, and the generation of the additional path may be started at the start timing t2 that is the generation margin time T11 before the completion prediction timing t1.

If the expected time T12 is shorter than the generation margin time T11, the generation time of the additional path cannot be sufficiently ensured before the completion prediction timing t1 because the start timing t2 that is the generation margin time T11 before the completion prediction timing t1 is already the past time at the timing when the auto command is fetched. To avoid this situation, the calling unit 111 changes the number of commands to be stored in the command storage unit 115 so that the expected time T12 is longer than the generation margin time T11.

Referring back to FIG. 3, when the auto command includes the condition information, the path plan unit 112 may generate the additional path further based on the condition information. For example, the path plan unit 112 may generate the additional path based on surrounding environment information such that the additional path satisfies a generation condition represented by condition information.

The plurality of commands may include a shift command for shifting the via point in addition to the move command and the auto command. When the calling unit 111 calls the auto command after the shift command, the path plan unit 112 generates an additional path up to a shift arrival point obtained by shifting a via point (arrival point) of the auto command based on the shift command. The plurality of commands may further include a shift-off command for turning off the shift of the via point by the shift command. When the calling unit 111 calls the auto command after the shift command and before the shift-off command, the path plan unit may generate an additional path up to the shift arrival point obtained by shifting the arrival point of the auto command based on the shift command.

The controller 100 may further include a task storage unit 121 and a task selection unit 123. The task storage unit 121 stores a plurality of tasks each including two or more move commands. The task selection unit 123 is configured to select one task from the plurality of tasks stored in the task storage unit 121.

If the controller 100 includes the task storage unit 121 and the task selection unit 123, the calling unit 111 may sequentially call two or more commands from one task selected by the task selection unit 123. The calling unit 111 may call the auto command before calling the move command included in the one task selected by the task selection unit 123. For example, the calling unit 111 may call an auto command before calling the first move command of one task selected by the task selection unit 123. The task selection unit 123 may select the next task at a timing when two or more commands included in the previously selected task are called by the calling unit 111.

The task storage unit 121 may store a plurality of tasks in advance, or may acquire a plurality of tasks from a host device (for example, a cloud computer or the like) and store the acquired plurality of tasks. The task selection unit 123 may select one task in a predetermined order from a plurality of tasks stored in the task storage unit 121, or may autonomously select a task suitable for the surrounding environment based on the surrounding environment information of the robot 3.

If the task selection unit 123 selects one task from the plurality of tasks in a predetermined order, the controller 100 may further include a flow information acquisition unit 127 and a flow storage unit 122. The flow information acquisition unit 127 acquires an executing order of a plurality of tasks based on user input to a user interface or the like and stores the executing order in the flow storage unit 122. The task selection unit 123 selects one task from a plurality of tasks in the executing order stored by the flow storage unit 122.

Figure 7:
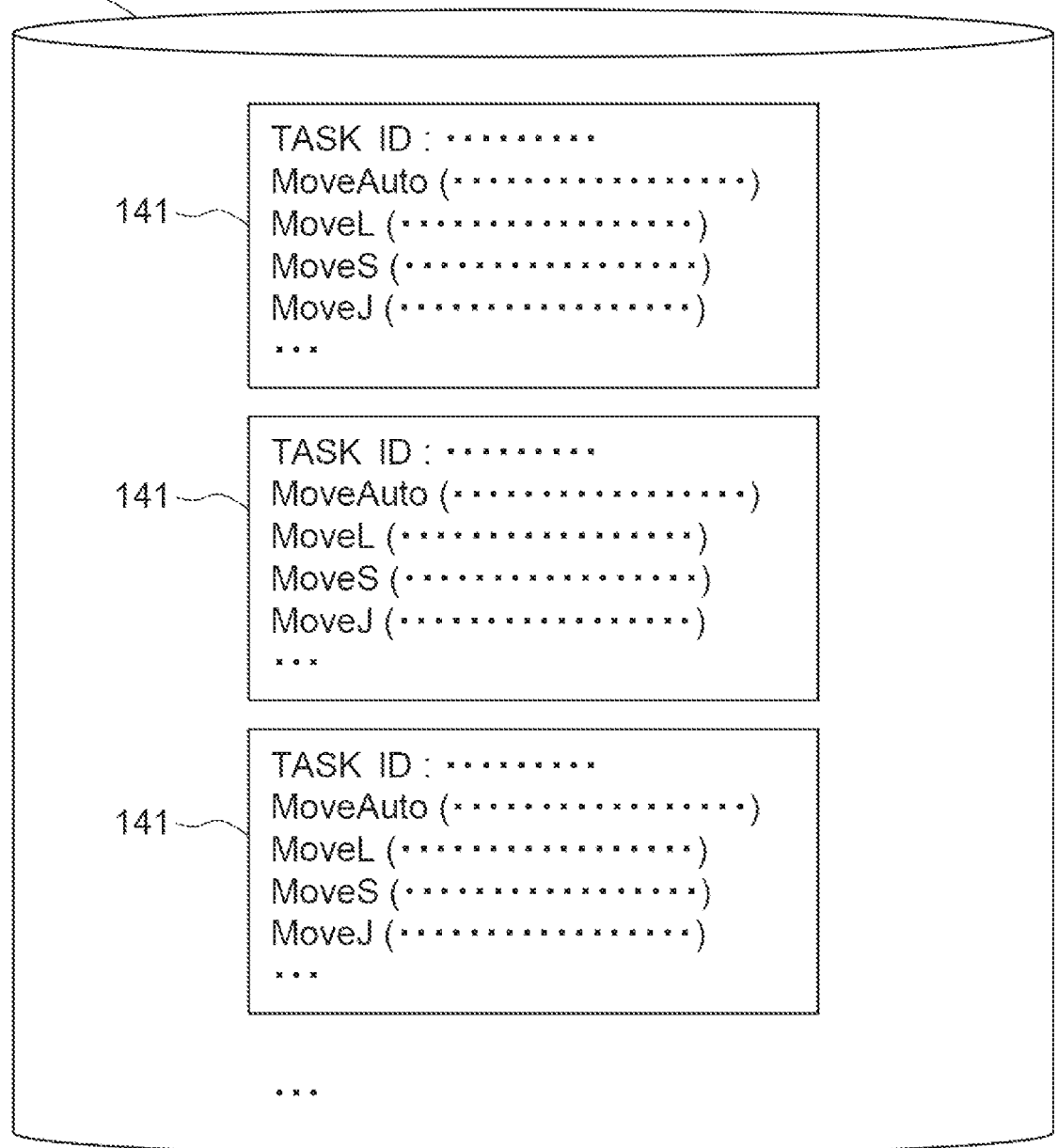
FIG. 7 is a schematic diagram illustrating example storage contents of a task storage unit.

At least one of the plurality of tasks may include an auto command before two or more move commands. For example, each of the tasks may include an auto command before two or more move commands. FIG. 7 is a diagram schematically illustrating stored contents of the task storage unit 121. In FIG. 7, the task storage unit 121 stores a plurality of a task 141. Each of the plurality of the task 141 includes two or more move commands and an auto command, and the auto command is arranged before (for example, at the head of) the two or more move commands. In this way, when each of the plurality of tasks includes an auto command, the calling unit 111 calls the auto command from one task selected by the task selection unit 123.

Returning to FIG. 3, the controller 100 may further include an auto command placement unit 124. When the first via point (a start point of the one task) is defined by a move command in one task, the auto command placement unit 124 adds, into the one task, the auto command including a start point of the one task as the arrival point. The auto command placement unit 124 may replace the move command defining the first via point with an auto command. Replacing is an example of adding. The auto command placement unit 124 may insert an auto command before the move command defining the first via point. Inserting is also an example of adding. For example, the auto command placement unit 124 may insert an auto command defining the first via point before a move command defining the first via point. With the auto command placement unit 124, an existing task that does not include an auto command may be converted into a task that includes an auto command and utilized.

Figure 8:
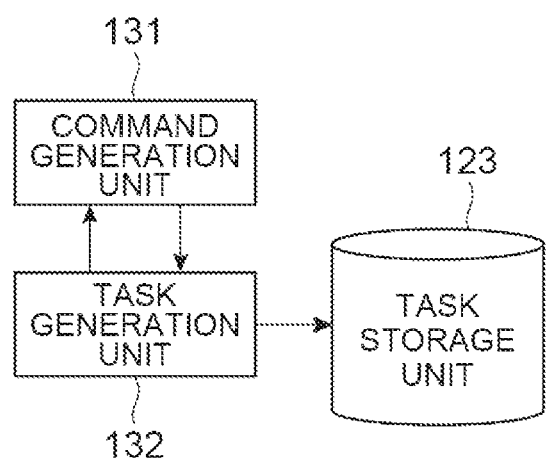
FIG. 8 is a block diagram illustrating a modification of the controller.

As illustrated in FIG. 8, the controller 100 may further include a command generation unit 131 and a task generation unit 132. The command generation unit 131 is configured to generate an auto command to be executed before two or more move commands based on task information specifying two or more move commands. For example, the command generation unit 131 may obtain task information based on user input to the user interface. For example, based on two or more move commands, the command generation unit 131 specifies an arrival point (task start point) in a transition operation to an operation corresponding to the two or more move commands, and generates an auto command including information of the specified arrival point.

The task generation unit 132 is configured to generate the task based on the generated auto command and the task information. For example, the task generation unit 132 generates the task by inserting the auto command generated by the command generation unit 131 before two or more move commands specified by the task information. With the command generation unit 131 and the task generation unit 132, a task generation operation including the auto command may be simplified. In addition, an operation failure between tasks due to omission of auto command arrangement may be prevented.

The calling unit 111 may be configured to interpret a move command called from the two or more move commands of the selected one task into the auto command including a start point of the selected one task as the arrival point in response to determining that the called move command defines the start point. For example, the calling unit 111 may read the move command defining the first via point as an auto command having the first via point as an arrival point. An additional path can be provided before one task while leaving an existing task that does not include an auto command without rewriting.

Returning to FIG. 3, the controller 100 may further include an environmental change check unit 125. The environmental change check unit 125 is configured to check whether there is a change in surrounding environment information before and after the path plan unit 112 generates the additional path based on the surrounding environment information. For example, the environmental change check unit 125 may check whether there is a change in the surrounding environment information after the surrounding environment information has been referred to for generating the additional path. For example, the environmental change check unit 125 confirms whether there is a change in surrounding environment information based on surrounding environment information stored by the environmental information database 212 (described later) of the host controller 200.

As an example, the environmental change check unit 125 represents the presence or absence of a change in the surrounding environment information by an environment flag. For example, the environmental change check unit 125 turns "off" the environment flag and obtains the surrounding environment information from the environmental information database 212 when the path plan unit 112 generates an additional path. Hereinafter, the surrounding environment information acquired at this timing is referred to as "reference information". Thereafter, when the surrounding environment information in the environmental information database 212 is updated, the environmental change check unit 125 compares the surrounding environment information after the update with the reference information, and changes the environment flag from "off" to "on" when recognizing a difference between the surrounding environment information after the update and the reference information.

The surrounding environment information may include items that do not affect the operation of the robot 3 along the additional path. The environmental change check unit 125 may check whether there is a change in the surrounding environment information based on items of the surrounding environment information that are designated in advance as items that may affect the operation of the robot 3 along the additional path.

The control unit 114 may operate the robot 3 based on the additional path if there is no change in the surrounding environment information before and after the path plan unit 112 generates the additional path. For example, the control unit 114 may check the environmental flag before operating the robot 3 based on the additional path and operate the robot 3 based on the additional path if the environmental flag is "off".

The control unit 114 may cease operation of the robot 3 based on the additional path if there is a change in the surrounding environment information before and after the path plan unit 112 generates the additional path. For example, the control unit 114 may check the environment flag before operating the robot 3 based on the additional command, and clear the contents of the command storage unit 115 if the environment flag is "on". Accordingly, since the speed pattern subsequent to the generated speed pattern is not generated, the operation of the robot 3 may be temporarily stopped at the time when the operation based on the generated speed pattern is completed.

If there is a change in surrounding environment information before and after the path plan unit 112 generates the additional path, the path plan unit 112 may regenerate the additional path based on the surrounding environment information after the change. For example, when the control unit 114 recognizes that the environment flag is "on", the path plan unit 112 may regenerate the additional path based on the auto command corresponding to the additional command and the surrounding environment information after the change. For example, the path plan unit 112 stores two or more regenerated additional commands in the path storage unit 113. Thereafter, the calling unit 111 sequentially reads the regenerated two or more additional commands and stores them in the command storage unit 115. When two or more regenerated additional commands are stored in the cleared the command storage unit 115, the operation of the robot 3 is resumed.

The additional path may be generated after the robot 3 starts an operation based on at least a plurality of commands. The path plan unit 112 may immediately generate an additional path at a timing at which a via point immediately before the via point of the auto command is determined.

In a case where the additional path is immediately generated at the timing at which the via point immediately before the via point of the auto command is determined, there is a possibility that the waiting time from the generation of the additional path to the operation start of the robot 3 based on the additional path becomes long. When the additional path is regenerated within the waiting time, the operation of the robot 3 can be continued by the regenerated additional path without stopping the operation of the robot 3. When there is a margin in the waiting time, the environmental change check unit 125 may check whether surrounding environment information is changed whenever the additional path is regenerated, and the path plan unit 112 may regenerate the additional path whenever the surrounding environment information is changed.

The controller 100 may further include a status transmission unit 126. The status transmission unit 126 transmits status information indicating the status of the robot 3 to the host controller 200 based on the control result of the robot 3 by the control unit 114. The status information includes, for example, the current angles of the joints 31, 32, 33, 34, 35, 36.

Host Controller

Figure 9:
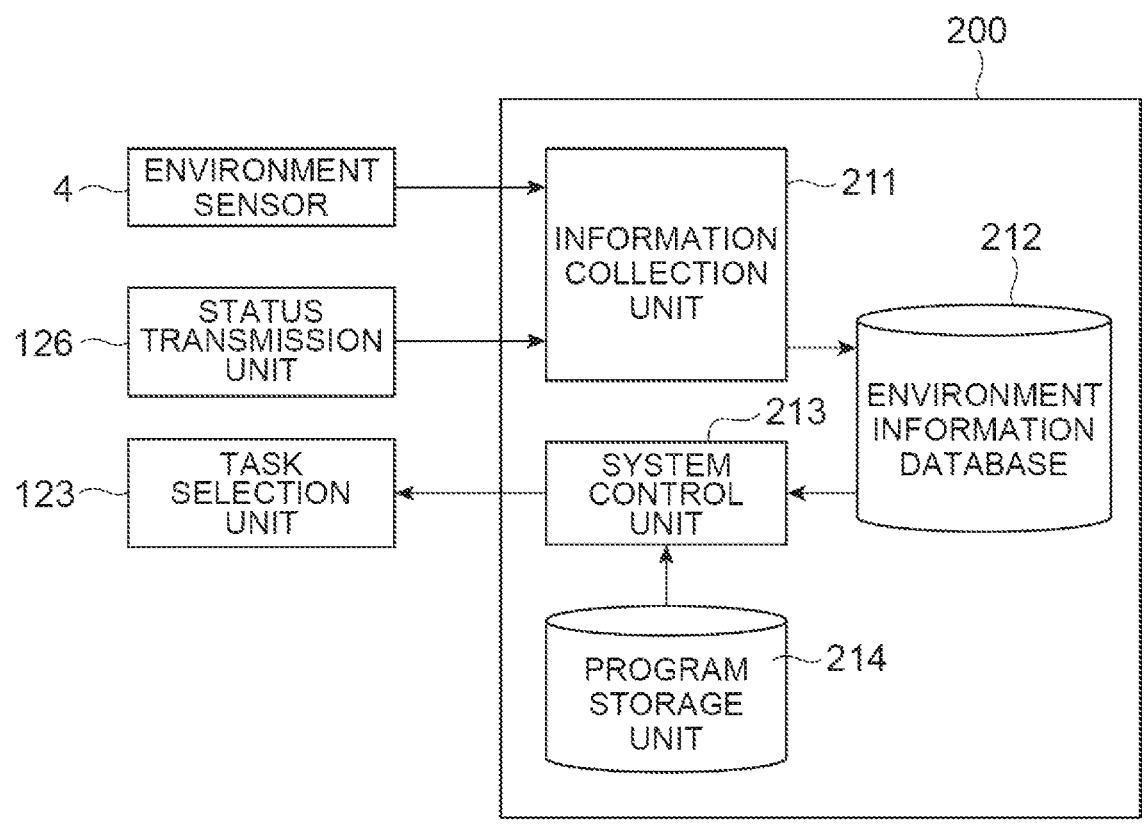
FIG. 9 is a block diagram illustrating an example configuration of a host controller.

FIG. 9 is a block diagram illustrating the configuration of the host controller 200. As illustrated in FIG. 9, the host controller 200 includes an information collection unit 211, the environmental information database 212, a system control unit 213, and a program storage unit 214 as functional blocks. The information collection unit 211 is configured to collect the surrounding environment information and stores it in the environmental information database 212.

The information collection unit 211 is configured to update the surrounding environment information at least before and after the path plan unit 112 generates the additional path. For example, the information collection unit 211 repeatedly collects the surrounding environment information in a predetermined update cycle, and accumulates the collection result in the environmental information database 212 in time series. For example, the information collection unit 211 may collect surrounding environment information based on status information received from the status transmission unit 126 of the controller 100, and may further collect surrounding environment information based on an environmental sensor 4 (see FIG. 1), such as a camera.

The program storage unit 214 stores a predetermined system program for causing the plurality of robots 3 to cooperatively perform a series of tasks. For example, the system program includes a series of work commands for each of the plurality of robots 3. The system program may include an output condition for at least one of the series of work commands.

The system control unit 213 is configured to output a work command to each of the plurality of robots 3 so as to cause the plurality of robots 3 to cooperatively perform a series of work. For example, the system control unit 213 sequentially outputs a series of work commands to each of the plurality of robots 3 based on the system program. When an output condition is defined for any of the series of work commands, the system control unit 213 outputs a work command corresponding to the output condition when surrounding environment information of the environmental information database 212 satisfies the output condition.

Examples of the work command include a command to execute any one of the plurality of tasks described above, a command to execute a plurality of tasks in the order of execution stored by the flow storage unit 122, and the like.

Figure 10:
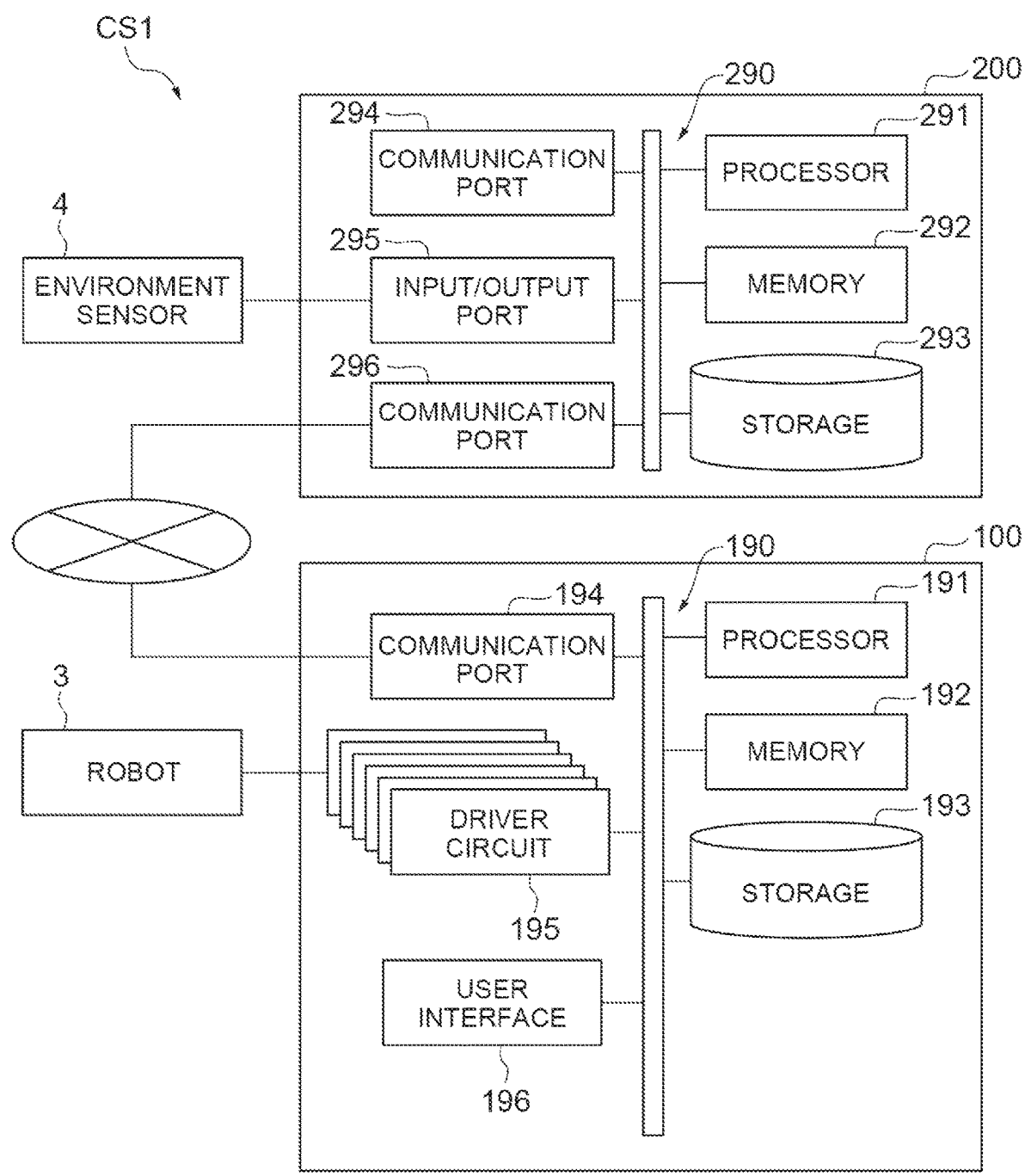
FIG. 10 is a block diagram illustrating an example hardware configuration of a controller and a host controller.

FIG. 10 is a block diagram illustrating example hardware configurations of the controller 100 and the host controller 200. The controller 100 includes circuitry 190. The circuitry 190 includes one or more processor(s) 191, a memory 192, storage 193, a communication port 194, a driver circuit 195, and a user interface 196. The storage 193 is a non-volatile storage medium and stores a program for causing the controller 100 to execute a control method including: sequentially calling a plurality of commands; generating an additional path; and operating the robot 3 based on the called commands and the additional path, the control method generating the additional path based on surrounding environment information when operating the robot 3 based on one command. For example, the storage 193 stores a program for configuring the above-described functional blocks in the controller 100. The storage 193 may be a built-in storage medium such as a flash memory or a hard disk, or may be a portable storage medium such as a USB flash drive or an optical disk.

The memory 192 temporarily stores the program loaded from the storage 193. Examples of the memory 192 include a random-access memory. The one or more processor(s) 191 configure each functional block described above by executing a program loaded into the memory 192. The one or more processor(s) 191 store the calculation result in the memory 192.

The communication port 194 is a communication port for synchronous communication of control, and communicates with the host controller 200 based on a request from one or more processor(s) 191. The driver circuit 195 supplies drive power to the actuators 41, 42, 43, 44, 45, 46 based on the request from the one or more processor(s) 191. The user interface 196 communicates with the user based on a request from one or more processor(s) 291. For example, the user interface 196 includes display devices and input devices. Examples of the display device include a liquid crystal monitor and an organic electro-luminescence (EL) monitor. Examples of the input device include a keyboard, a mouse, and a keypad. The input device may be integrated with the display device as a so-called touch panel.

The host controller 200 includes circuitry 290. The circuitry 290 includes one or more processor(s) 291, a memory 292, storage 293, a communication port 294, an input/output port 295, and a communication port 296. The storage 293 is a non-volatile storage medium, and stores a program for configuring each functional block described above in the host controller 200. The storage 293 may be a built-in storage medium such as a flash memory or a hard disk, or may be a portable storage medium such as a USB flash drive or an optical disk.

The memory 292 temporarily stores the program loaded from the storage 293. Examples of the memory 292 include a random-access memory. The one or more processor(s) 291 configure each functional block described above by executing a program loaded into the memory 292. The one or more processor(s) 291 store the calculation result in the memory 292.

The communication port 296 is a communication port for synchronous communication of control, and communicates with the controller 100 based on a request from one or more processor(s) 291. The input/output port 295 acquires information from the environmental sensor 4 or the like based on a request from one or more processor(s) 291. The communication port 294 is a communication port for communication of a system different from synchronous communication of control.

The hardware configuration described above is merely an example and can be changed. For example, the control system CS1 may not be divided into the controller 100 and the host controller 200. For example, the controller 100 may be incorporated into the host controller 200. In addition to the controller 100 and the host controller 200, the control system CS1 may further include the above-described simulation device. The controller 100 may be configured to cause the simulation device to generate the additional path based on surrounding environment information.

Control Procedure

Next, as an example of the control method, a control procedure executed by the control system CS1 will be described. The procedure includes sequentially calling a plurality of commands, generating an additional path, and operating the robot 3 based on the commands and the additional path, and generates an additional path based on the surrounding environment information when operating the robot 3 based on one command. The control procedure by the control system CS1 may include a task generation procedure, an auto command placement procedure, and a program generation procedure performed by the controller 100, a system control procedure performed by the host controller 200, and a command calling procedure, an environment change check procedure, and a robot control procedure performed by the controller 100. Hereinafter, each procedure will be described in detail.

Auto Command Placement Procedure

Figure 11:
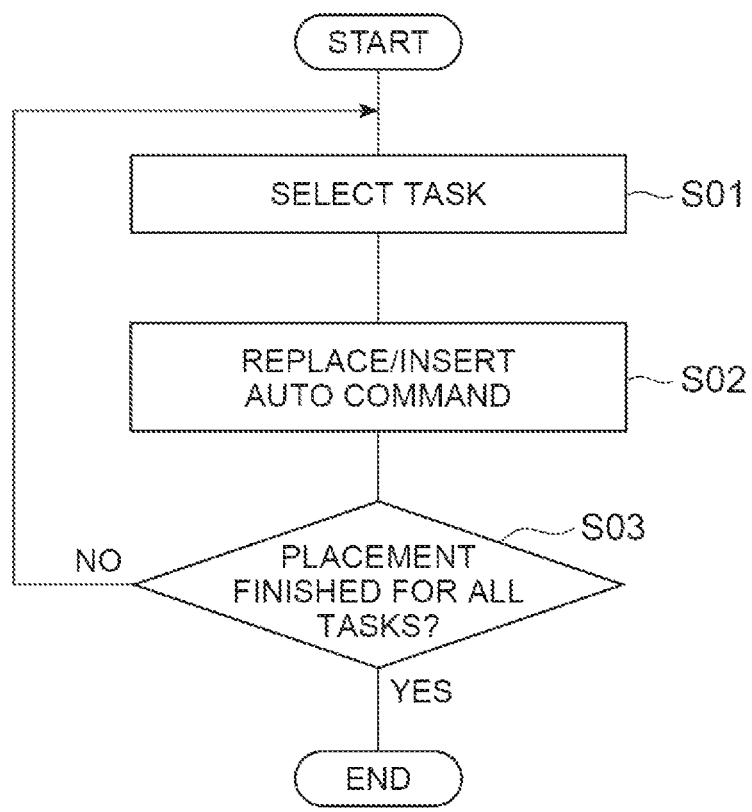
FIG. 11 is a flowchart illustrating an example auto command placement procedure.

As illustrated in FIG. 11, the controller 100 executes operations S01, S02, and S03. In operation S01, the auto command placement unit 124 selects one task that does not include an auto command from a plurality of tasks stored by the task storage unit 121. In operation S02, if the first via point is defined by a move command in one task, the auto command placement unit 124 replaces the move command defining the first via point with an auto command. The auto command placement unit 124 may insert an auto command before the move command defining the first via point.

In operation S03, the auto command placement unit 124 checks whether the auto command has been placed for all tasks that do not include the auto command. If it is determined in operation S03 that task that does not include auto command remains, the controller 100 returns the processing to operation S01. If it is determined in operation S03 that the auto command has been placed for all tasks that do not include the auto command, the controller 100 completes the processing.

Task Generation Procedure

Figure 12:
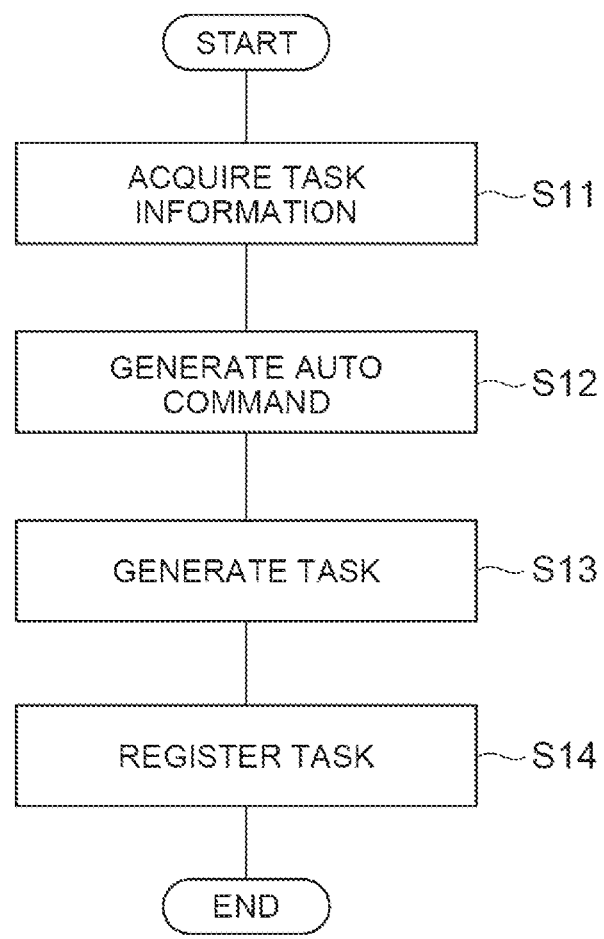
FIG. 12 is a flowchart illustrating an example task generation procedure.

As illustrated in FIG. 12, the controller 100 executes operations S11, S12, S13, and S14. In operation S11, the command generation unit 131 acquires task information specifying two or more move commands. The command generation unit 131 may obtain task information from the user interface 196.

In operation S12, the command generation unit 131 generates an auto command to be executed before two or more move commands based on the acquired task information. For example, based on two or more move commands, the command generation unit 131 generates an auto command including information of an arrival point (start point of a task) in a transition operation to an operation corresponding to the two or more move commands.

In operation S13, the task generation unit 132 generates task based on the generated auto command and task information. For example, the task generation unit 132 generates the task by inserting the auto command generated by the command generation unit 131 before two or more move commands specified by the task information. In operation S14, the task generation unit 132 stores the generated task in the task storage unit 121. This completes the task generation procedure.

Program Generation Procedure

Figure 13:
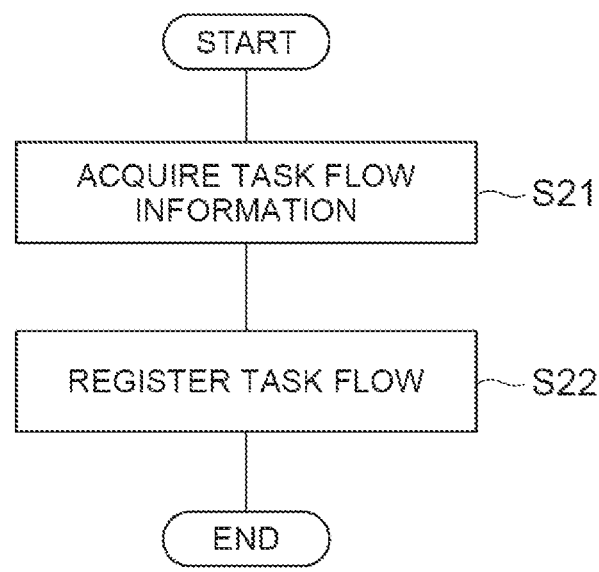
FIG. 13 is a flowchart illustrating an example program generation procedure.

As illustrated in FIG. 13, the controller 100 executes operations S21 and S22. In operation S21, the flow information acquisition unit 127 acquires the order of executing a plurality of tasks. In operation S22, the flow information acquisition unit 127 stores the order of executing in the flow storage unit 122. This completes the generation of the operation program of the robot 3.

System Control Procedure

Figure 14:
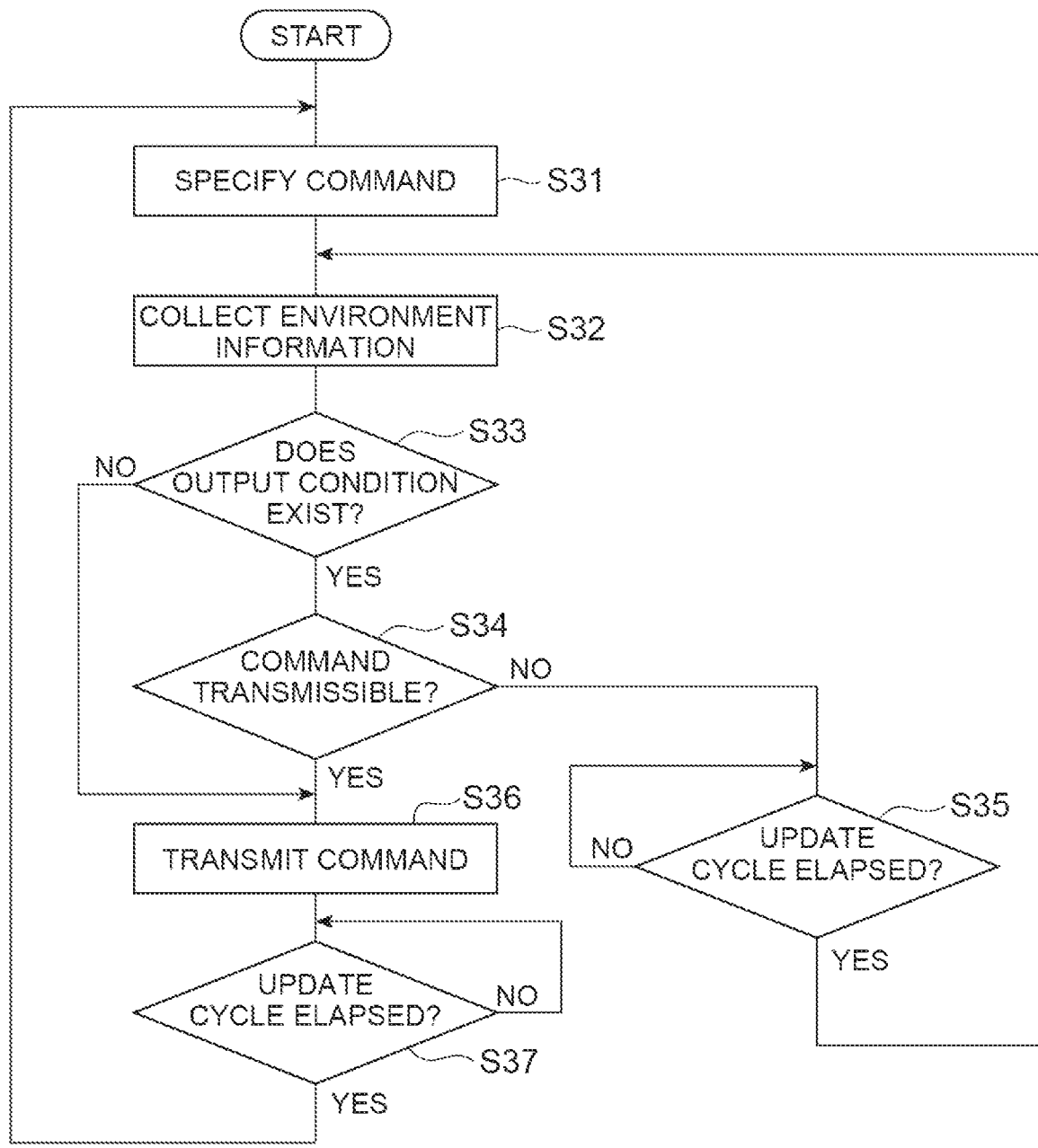
FIG. 14 is a flowchart illustrating an example system control procedure.

As illustrated in FIG. 14, the host controller 200 executes operations S31, S32, and S33. In operation S31, the system control unit 213 specifies a work command to be output to the controller 100 next based on the system program in the program storage unit 214. Hereinafter, the specified work command is referred to as a work command to be output. In operation S32, the information collection unit 211 collects the surrounding environment information, adds time information to a set of surrounding environment information that is collected, and stores the surrounding environment information in the environmental information database 212. In operation S33, the system control unit 213 checks whether the output condition is given to the work command to be output.

If it is determined in operation S33 that the output condition is given to the work command to be output, the host controller 200 executes operation S34. In operation S34, the system control unit 213 checks whether the surrounding environment information satisfies the output condition. If it is determined in operation S34 that the surrounding environment information does not satisfy the output condition, the host controller 200 executes operation S35. In operation S35, the information collection unit 211 waits for the update cycle to elapse. The host controller 200 then returns to the operation S32. Thereafter, the surrounding environment information is repeatedly collected in each update cycle until the surrounding environment information satisfies the output condition.

If it is determined in operation S34 that the surrounding environment information satisfies the output condition, the host controller 200 executes operations S36 and S37. In operation S33, if it is determined that the output condition is not given to the work command to be output, the host controller 200 executes operations S36 and S37. In operation S36, the system control unit 213 transmits a work command to be output to the controller 100. In operation S37, the system control unit 213 waits for the update cycle to elapse. The controller 100 then returns to the operation S31. The host controller 200 repeatedly executes the above processing.

Command Calling Procedure

Figure 15:
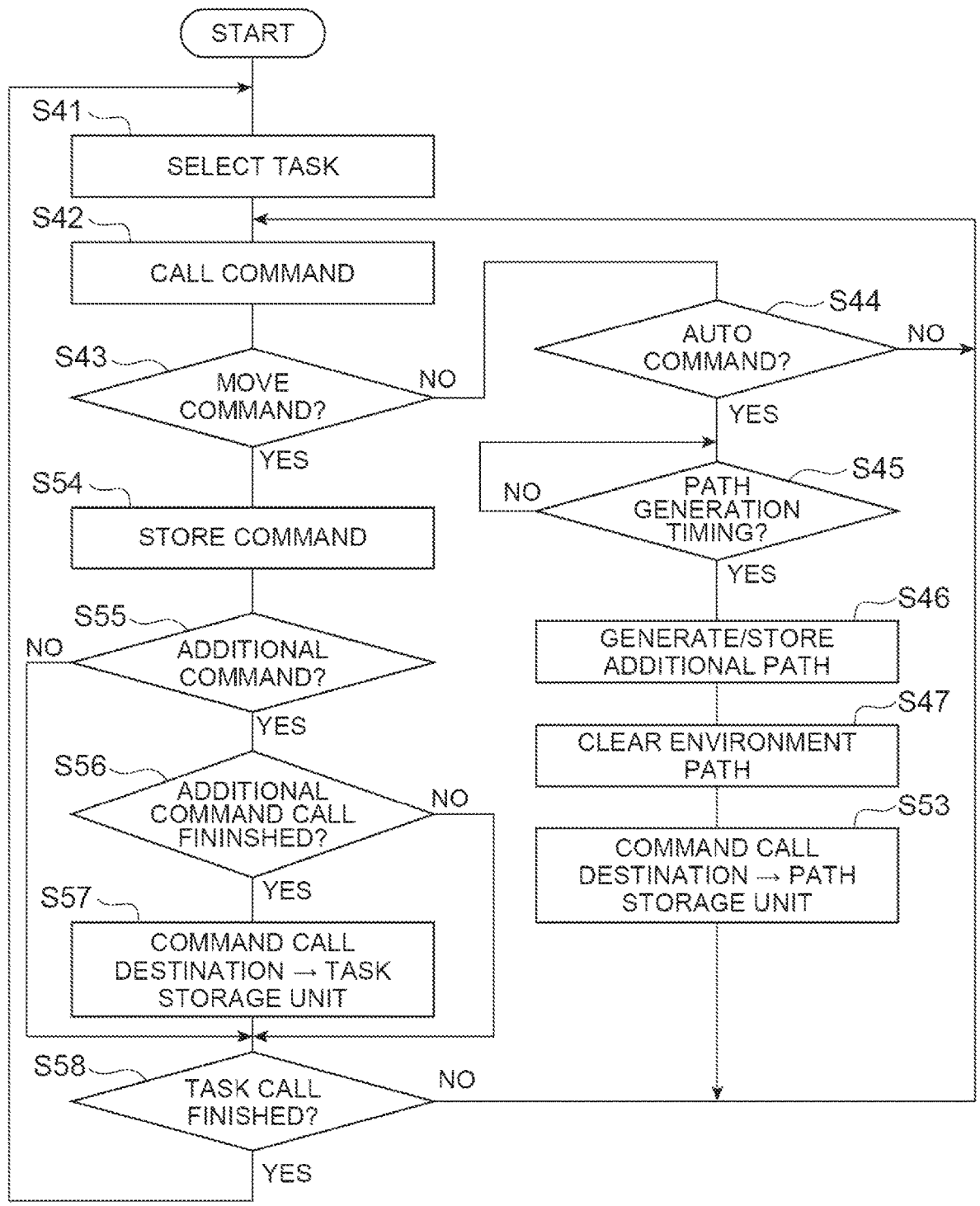
FIG. 15 is a flowchart illustrating an example command calling procedure.

As illustrated in FIG. 15, the controller 100 first executes operations S41, S42, and S43. In operation S41, the task selection unit 123 selects one task from a plurality of tasks stored in the task storage unit 121. For example, the task selection unit 123 selects one task from a plurality of tasks in the executing order stored by the flow storage unit 122. In operation S42, the calling unit 111 calls one command from the one task. In operation S43, the calling unit 111 checks whether the one command is a move command.

If it is determined in operation S43 that the one command is not a move command, the controller 100 executes operation S44. In operation S44, the calling unit 111 checks whether the one command is an auto command. If it is determined in operation S44 that the one command is not an auto command, the controller 100 returns the processing to operation S42.

If it is determined in operation S44 that the one command is an auto command, the controller 100 executes operations S45, S46, and S47. In operation S45, the path plan unit 112 waits for the generation start timing of the additional path. For example, the path plan unit 112 waits for a timing before a predetermined generation margin time from the completion prediction timing of the preceding operation. In operation S46, the path plan unit 112 generates an additional path from a via point (starting point) immediately before the arrival point of the auto command to the arrival point of the auto command, and stores the generated additional path in the path storage unit 113. In operation S47, the environmental change check unit 125 sets the environment flag to "off" (or clears the environment flag).

Next, the controller 100 executes operation S53. In operation S53, the path plan unit 112 changes the call destination of the command by the calling unit 111 from the task storage unit 121 to the path storage unit 113. The controller 100 then returns to the operation S42. In operation S42, the command is called from the path storage unit 113.

If it is determined in operation S43 that the one command is the move command, the controller 100 executes operations S54 and S55. In operation S54, the calling unit 111 stores the called command in the command storage unit 115. In operation S55, the calling unit 111 checks whether the called command is an additional command.

If it is determined in operation S55 that the called command is the additional command, the controller 100 executes operation S56. In operation S56, the calling unit 111 checks whether all the additional commands stored in the path storage unit 113 have been called.

If it is determined in operation S56 that all the additional commands have been called, the controller 100 executes operation S57. In operation S57, the calling unit 111 changes the call destination of the command from the path storage unit 113 to the task storage unit 121.

Next, the controller 100 executes operation S58. If it is determined in operation S56 that an additional command that has not yet been called remains, the controller 100 executes operation S57 without executing operation S58. If it is determined in operation S55 that the called command is not an additional command, the controller 100 executes operation S56 without executing operations S57 and S58. In operation S58, the calling unit 111 checks whether all commands included in the one task have been called.

If it is determined in operation S58 that a command that has not yet been called remains in the one task, the controller 100 returns the processing to operation S42. As a result, the command is continuously called from the one task. If it is determined in operation S58 that all commands included in the one task have been called, the controller 100 returns the process to operation S41. Thus, the next task is selected. The controller 100 repeatedly executes the above procedure. In FIG. 15, processing in a case where the plurality of commands are commands that are neither move commands nor auto commands (for example, the above-described shift command) is omitted. When a plurality of commands include a command that is neither a move command nor an auto command, processing for the command is added as appropriate.

Figure 16:
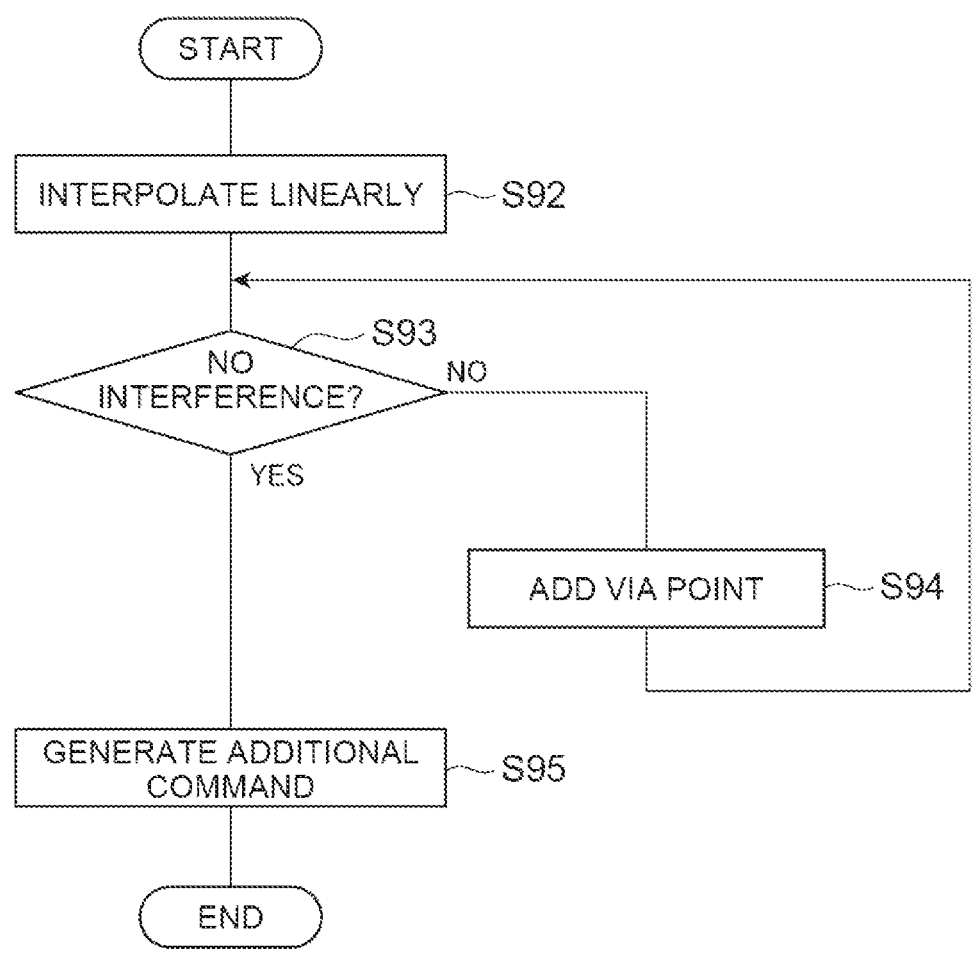
FIG. 16 is a flowchart illustrating an example path generation procedure.

FIG. 16 is a flowchart illustrating a procedure for generating an additional path in operation S46. As illustrated in FIG. 16, the controller 100 first executes operations S92 and S93. In operation S92, the path plan unit 112 tentatively generates an additional path by linearly interpolating the start point and the arrival point. In operation S93, the interference check unit 152 simulates the motion of the robot 3 based on the additional path, and checks whether there is interference between the robot 3 and the peripheral object.

If it is determined in operation S93 that there is interference, the controller 100 executes operation S94. In operation S94, the path plan unit 112 randomly generates a via point that does not interfere with the peripheral object, inserts the via point between the start point and the arrival point, and corrects the additional path. The controller 100 then returns to the operation S93. Thereafter, generation and addition of the via point are repeated until interference between the robot 3 and the peripheral object due to the additional path does not occur.

If it is determined in operation S93 that there is no interference, the controller 100 executes operation S95. In operation S95, the path plan unit 112 generates a plurality of additional commands having the added one or more via points and the end point as via points. Thus, the path generation procedure is completed.

Environmental Change Check Procedure

Figure 17:
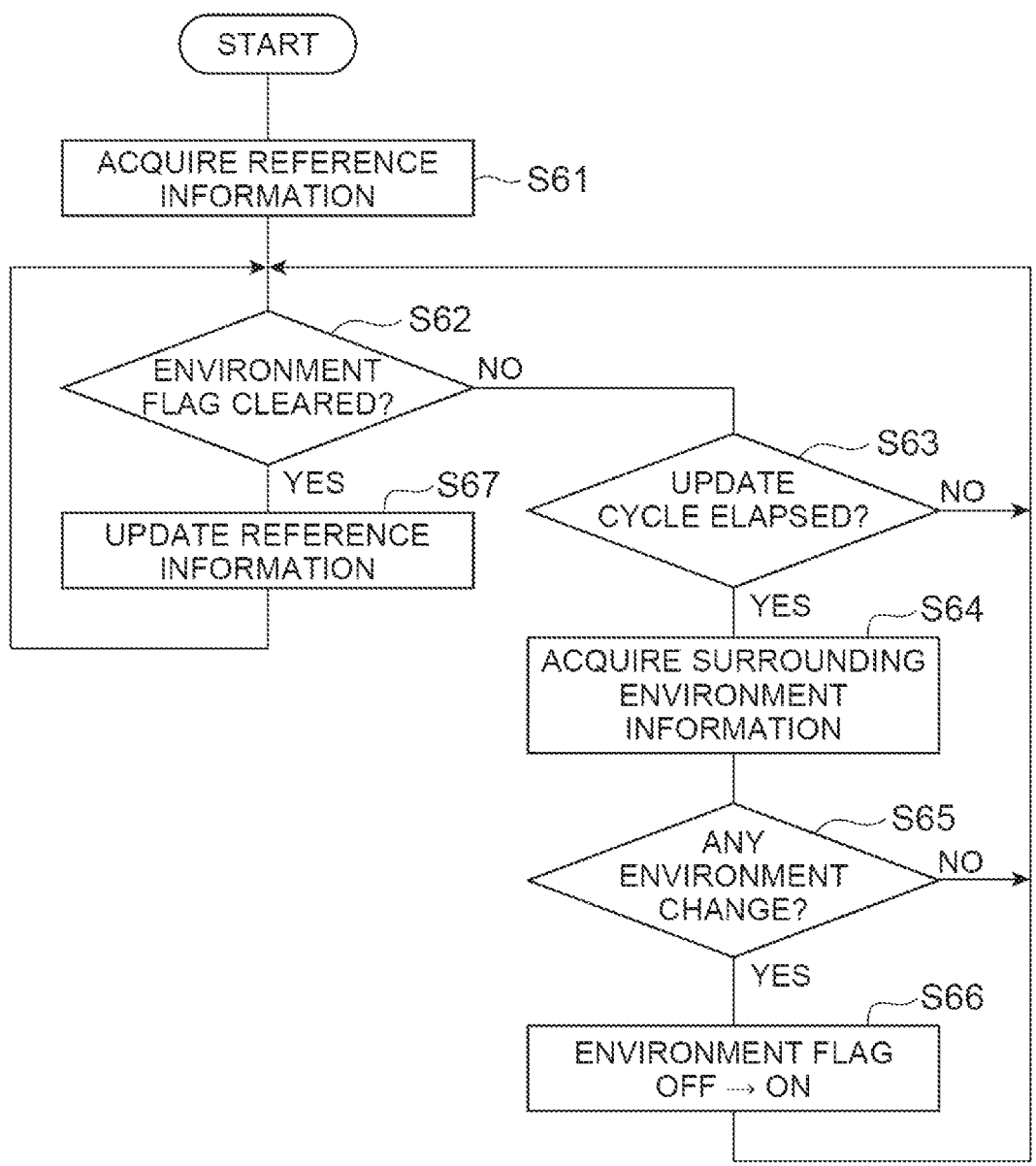
FIG. 17 is a flowchart illustrating an example environmental change check procedure.

As illustrated in FIG. 17, the controller 100 executes operations S61 and S62. In operation S61, the environmental change check unit 125 acquires the surrounding environment information from the environmental information database 212 as the reference information. In operation S62, the environment change check unit 125 checks whether the environment flag is cleared in the above-described command calling procedure.

If it is determined in operation S62 that the environment flag is not cleared, the controller 100 executes operation S63. In operation S63, it is confirmed whether the update cycle of the environment flag has elapsed. If it is determined in operation S63 that the update cycle has not elapsed, the controller 100 returns processing to operation S62. Thereafter, operations S62 and S63 are repeated until the environment flag is cleared or the update cycle has elapsed.

If it is determined in operation S63 that the update cycle has elapsed, the controller 100 executes operations S64 and S65. In operation S64, the environmental change check unit 125 obtains the surrounding environment information from the environmental information database 212. In operation S65, the environmental change check unit 125 compares the surrounding environment information acquired in operation S64 with the reference information, and confirms whether there is a change in the surrounding environment information.

If it is determined in operation S65 that there is no change in the surrounding environment information, the controller 100 returns the processing to operation S62. If it is determined in operation S65 that there is a change in the surrounding environment information, the controller 100 performs operation S66. In operation S66, the environmental change check unit 125 changes the environment flag from "off" to "on". The controller 100 then returns to the operation S62.

If it is determined in operation S62 that the environment flag has been cleared, the controller 100 executes operation S67. In operation S67, the environmental change check unit 125 acquires the surrounding environment information from the environmental information database 212, and updates the reference information with the acquired surrounding environment information. The controller 100 then returns to the operation S62. Thereafter, while updating the reference information in response to the clearing of the environment flag, the presence or absence of a change in the surrounding environment information is repeatedly checked for each update cycle.

Robot Control Procedure

Figure 18:
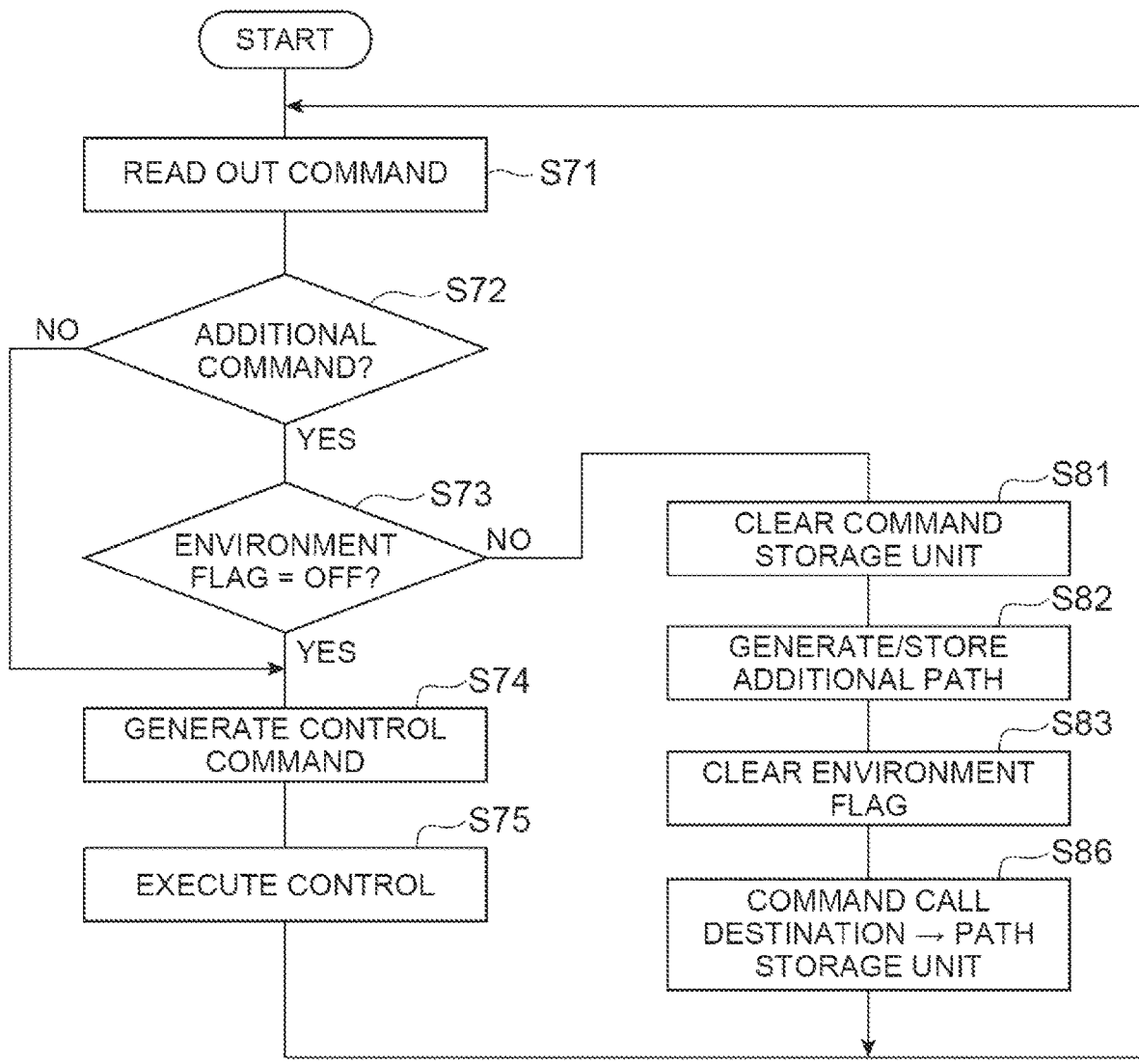
FIG. 18 is a flowchart illustrating an example control procedure of a robot based on a command.

As illustrated in FIG. 18, the controller 100 first executes operations S71 and S72. In operation S71, the control unit 114 reads one command from the command storage unit 115. In operation S72, the control unit 114 checks whether the one command is an additional command.

If it is determined in operation S72 that the one command is not an additional command, the controller 100 executes operations S74 and S75. In operation S74, the control unit 114 generates a series of control commands (for example, a speed pattern) based on two or more commands including one command and one or more previously read commands. In operation S75, the control unit 114 starts controlling the robot 3 based on the series of control commands generated in operation S74. The controller 100 then returns to the operation S71.

If it is determined in operation S72 that the one command is an additional command, the controller 100 executes operation S73. In operation S73, the control unit 114 checks whether the environment flag is off. If it is determined in operation S73 that the environment flag is off, the controller 100 advances the process to operation S74.

If it is determined in operation S73 that the environment flag is on, the controller 100 executes operations S81, S82, and S83. In operation S81, the control unit 114 clears (erases) the contents of the command storage unit 115. In operation S82, the path plan unit 112 waits for the timing of the auto command corresponding to the additional command based on the surrounding environment information. In operation S82, the path plan unit 112 regenerates an additional path from a via point (starting point) immediately before the arrival point of the auto command to the arrival point of the auto command, and stores the generated additional path in the path storage unit 113. In operation S83, the environmental change check unit 125 sets (clears) the environment flag to "off".

Next, the controller 100 executes operation S86. In operation S86, the path plan unit 112 changes the call destination of the command by the calling unit 111 from the task storage unit 121 to the path storage unit 113. As a result, the regenerated two or more additional commands are sequentially called by the calling unit 111 in the command calling procedure described above and stored in the command storage unit 115. The controller 100 then returns to the operation S71. The controller 100 repeatedly executes the above processing.

SUMMARY

The robot system 1 includes: the calling unit 111 configured to sequentially call a plurality of commands representing an operation path of the robot 3 including an undetermined section; the path plan unit 112 configured to generate an additional path for the undetermined section; and the control unit 114 configured to operate the robot 3 based on the command called by the calling unit 111 and the additional path. The path plan unit 112 is configured to generate the additional path based on the surrounding environment information of the robot 3 when the control unit 114 is operating the robot 3 based on one command.

In this robot system 1, the additional path is generated based on the surrounding environment information after the robot 3 starts an operation based on a plurality of commands, and an operation by the robot 3 is continued based on the generated additional path. Therefore, it is the robot 3 may perform an operation flexibly corresponding to changes in the surrounding environment, changes in the work content, changes in the work procedure, and the like. Hereinafter, generating an additional path after the robot 3 starts an operation based on a plurality of commands is referred to as "online path generation".

The plurality of commands may include a move command including information of a via point of the operation path and an auto command including information of a via point of the operation path which is an arrival point of an undetermined section. When the control unit 114 is operating the robot 3 based on the move command, the path plan unit 112 may generate an additional path to the arrival point in the undetermined section based on an auto command after the move command and surrounding environment information. A section where the robot 3 is operated may readily be designated by a predetermined operation path and a section where the robot 3 is operated by an additional path generated by the path plan unit 112. An operation program of an existing the robot 3 may be described by listing a plurality of commands including a move command. In the configuration in which the additional path is generated based on the auto command and the surrounding environment information, Operation program including online path generation may readily be generated by using an existing operation program.

The robot system 1 may further include: the task storage unit 121 configured to store a plurality of tasks each including two or more move commands; and the task selection unit 123 configured to select one task from among the plurality of tasks stored in the task storage unit 121. The calling unit 111 may call the auto command before calling the move command included in the one task selected by the task selection unit 123. The robot 3 may readily be operated based on a plurality of individually generated tasks.

At least one of the tasks may include an auto command before two or more move commands. The calling unit 111 may call an auto command from the one task selected by the task selection unit 123. Based on the plurality of individually generated tasks, the robot 3 can be more readily operated.

The robot system 1 may comprise: the command generation unit 131 configured to generate an auto command to be executed before two or more move commands based on task information specifying the two or more move commands; and the task generation unit 132 configured to generate a task based on the generated auto command and the task information. The task generation operation including the auto command can be simplified. In addition, an operation failure between tasks due to omission of auto command placement may be prevented.

The robot system 1 may further include the auto command placement unit 124 configured to replace the move command defining the first via point with the auto command or inserting the auto command before the move command defining the first via point when the first via point is defined by the move command in the one task. An existing task having no auto command can be readily converted into a task including the auto command.

When the first via point is defined by a move command in one task, the calling unit 111 may read the move command defining the first via point as an auto command having the first via point as an arrival point. Online path generation may be used while leaving an existing task that does not include an auto command without rewriting.

The path plan unit 112 may generate an additional path from a via point immediately preceding the arrival point to the arrival point. By setting the immediately preceding via point as the starting point, the starting point may not be determined by the auto command, and thus the auto command can be simplified.

The plurality of commands may include a shift command for shifting a via point. When the calling unit 111 calls the auto command after the shift command, the path plan unit 112 may generate an additional path to a shift arrival point obtained by shifting a via point of the auto command based on the shift command. By making the shift command also applicable to the auto command, the operation programming can be further simplified.

The path plan unit 112 may start the generation of the additional path at a timing at which the generation of the additional path is completed before the operation corresponding to the move command immediately preceding the auto command is completed. A state in which the robot 3 stops in order to wait for the generation of the additional path may be reduced and to operate the robot 3 more smoothly.

The path plan unit 112 may generate two or more new move commands defining an additional path based on the surrounding environment information. The operation for generating the additional path can be simplified.

After the calling unit 111 calls the auto command, the path plan unit 112 may generate two or more new move commands defining an additional path based on the auto command and surrounding environment information. The calling unit 111 may store two or more commands in the command storage unit 115, the two or more commands including two or more new move commands. The control unit 114 may operate the robot 3 based on two or more commands stored by the command storage unit 115. By operating the robot 3 based on two or more commands stored by the command storage unit 115, the state in which the robot 3 stops to wait for the next command can be reduced and the robot 3 can be operated more smoothly. As described above, by combining the result of the online path generation with the mechanism for operating the robot 3 based on two or more commands stored by the command storage unit 115, the operation section based on the path information of the move command and the operation section based on the additional path may be smoothly connected and the robot 3 may operate more smoothly.

The control unit 114 may generate a series of control commands for the robot 3 based on the two or more commands stored by the command storage unit 115 and operate the robot 3 based on the series of control commands. The robot 3 can be operated more smoothly.

The calling unit 111 may change the number of commands to be stored in the command storage unit 115 such that an expected time of an operation corresponding to two or more commands stored in the command storage unit 115 is longer than at least a time for generating an additional path by the path plan unit 112. The state in which the robot 3 stops in order to wait for the generation of the additional path may further be reduced and the robot 3 may operate more smoothly.

The auto command may include condition information indicating a generation condition when the additional path is generated based on surrounding environment information. The path plan unit 112 may generate an additional path further based on the condition information. A more suitable additional path can be generated by setting the condition information.

The robot system 1 may further have the interference check unit 152 that simulates the operation of the robot 3 based on the additional path generated by the path plan unit 112 to confirm that the robot 3 does not interfere with peripheral objects present in the surrounding environment. The control unit 114 may operate the robot 3 based on the additional path generated by the path plan unit 112 if the robot 3 does not interfere with the peripheral object. Reliability of operation of the robot 3 including online path generation may be improved.

The robot system 1 may further comprise: the information collection unit 211 configured to update the surrounding environment information at least before and after the path plan unit 112 generates the additional path; and the environmental change check unit 125 configured to check whether there is a change in surrounding environment information before and after the path plan unit 112 generates an additional path based on surrounding environment information. The reliability of the robot 3 operations including online path generation can be further improved.

The control unit 114 may operate the robot 3 based on the additional path if there is no change in the surrounding environment information before and after the path plan unit 112 generates the additional path. The reliability of the robot 3 operations including online path generation can be further improved.

If there is a change in the surrounding environment information before and after generating the additional path, the path plan unit 112 may regenerate the additional path based on the surrounding environment information after the change. The reliability of the robot 3 operations including online path generation can be further improved.

The exampled described above include a robot system including: the calling unit 111 configured to sequentially call a plurality of commands including a plurality of move commands including information of a via point of an operation path of the robot 3 including an undetermined section and an auto command including information of a via point of an operation path serving as an arrival point of an undetermined section; the path plan unit 112 configured to generate an additional path to the arrival point in the undetermined section based on the auto command and the surrounding environment information of the robot 3; and the control unit 114 configured to operate the robot 3 based on the command called by the calling unit 111 and the additional path.

Further, the examples described above include a task generation device comprising: the command generation unit 131 configured to generate an auto command including information of an arrival point in a transition operation to an operation corresponding to two or more move commands based on the task information specifying two or more move commands each including information of a via point of an operation path of the robot 3; and the task generation unit 132 configured to generate a task based on the generated auto command and task information. When the task is selected, an additional path up to the robot 3 point of the auto command of task is generated based on the surrounding environment information of the arrival point, and the robot 3 operates based on the generated additional path and two or more move commands of the task.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:
1. A robot system comprising:
a robot; and
circuitry configured to:
sequentially call a plurality of operating commands representing an operation path of the robot including a predetermined section and an undetermined section, wherein the plurality of operating commands are pre-arranged and stored in advance of operating the robot and include one or more move commands that define the predetermined section, and an auto command that designates an arrival point of the undetermined section;
operate the robot to move along the predetermined section in response to calling the one or more move commands;
generate, in response to calling the auto command, an additional path to the arrival point of the undetermined section based on surrounding environment information of the robot, wherein the additional path is generated while operating the robot based on the one or more move commands; and operate the robot to move along the additional path toward the arrival point.

2. The robot system according to claim 1, wherein the circuitry is further configured to:

store a plurality of tasks each including two or more move commands, the two or more move commands each designating a different via point of the predetermined section;

select one task from the plurality of stored tasks to form the predetermined section; and call the auto command before calling the two or more move commands included in the selected one task.

3. The robot system according to claim 2, wherein at least one of the plurality of tasks includes the auto command before the two or more move commands, and wherein the circuitry is configured to call the auto command from the selected one task.

4. The robot system according to claim 3, wherein the plurality of tasks includes a first task including the two or more move commands, and a second task including two or more additional move commands, and wherein the circuitry is further configured to:

generate a first auto command to be executed before the two or more move commands based on the two or more move commands;

generate the first task based on the first generated auto command and the two or more move commands;

generate a second auto command to be executed before the two or more additional move commands based on the two or more additional move commands;

generate the second task based on the second generated auto command and the two or more additional move commands; and store the first generated task and the second generated task to be included in the plurality of tasks.

5. The robot system according to claim 3, wherein the circuitry is further configured to add, into the selected one task, the auto command designating a start point of the one task as the arrival point.

6. The robot system according to claim 2, wherein the circuitry is configured to interpret a move command called from the two or more commands of the selected one task into the auto command designating a start point of the selected one task as the arrival point in response to determining that the called move command defines the start point.

7. The robot system according to claim 1, wherein the circuitry is configured to generate the additional path from the via point located before the arrival point in the operation path.

8. The robot system according to claim 7, wherein the plurality of operating commands include a shift command for shifting the via point, and wherein the circuitry is configured to, in response to determining that the auto command is called after the shift command, shift the arrival point according to the shift command before generating the additional path to the arrival point.

9. The robot system according to claim 1, wherein the circuitry is configured to determine a start timing of generation of the additional path based on the auto command subsequent to a preceding move command of the one or more move commands, so that the generation of the additional path is completed before an operation based on the preceding move command is completed.

10. The robot system according to claim 1, wherein the circuitry is configured to generate two or more additional move commands defining the additional path based on the surrounding environment information.

11. The robot system according to claim 10, wherein the circuitry is configured to:

generate, after calling the auto command, the two or more additional move commands based on the auto command and the surrounding environment information;

store two or more commands including the two or more additional move commands in a command storage; and operate the robot based on the two or more commands stored in the command storage.

12. The robot system according to claim 11, wherein the circuitry is configured to:

generate a series of control commands for smoothing the operation path based on the two or more commands stored in the command storage; and operate the robot based on the series of control commands.

13. The robot system according to claim 12, wherein the circuitry is configured to modify a size of the command storage such that an expected length of time of an operation corresponding to the two or more commands stored in the command storage exceeds a length of time to generate the additional path.

14. The robot system according to claim 1, wherein the auto command includes condition information representing a generation condition for generating the additional path, and wherein the circuitry is configured to generate the additional path further based on the condition information.

15. The robot system according to claim 1, wherein the circuitry is further configured to:

simulate an operation of the robot based on the generated additional path;

check whether the robot interferes with a peripheral object based on the surrounding environment information; and operate the robot based on the generated additional path in response to determining that the robot does not interfere with the peripheral object.

16. The robot system according to claim 1, wherein the circuitry is further configured to:

update the surrounding environment information; and check whether there is a change in the surrounding environment information after the surrounding environment information has been referred to for generating the additional path.

17. The robot system according to claim 16, wherein the circuitry is configured to operate the robot based on the additional path in response to determining that there is no change in the surrounding environment information.

18. The robot system according to claim 17, wherein the circuitry is configured to, in response to determining that there is a change in the surrounding environment information, regenerate the additional path based on the changed surrounding environment information.

19. A control method comprising:

sequentially calling a plurality of operating commands representing an operation path of a robot including a predetermined section and an undetermined section, wherein the plurality of operating commands are pre-arranged and stored in advance of operating the robot and include one or more move commands that define the predetermined section, and an auto command that designates an arrival point of the undetermined section;

operating the robot to move along the predetermined section in response to calling the one or more move commands;

generating, in response to calling the auto command, an additional path to the arrival point of the undetermined section based on surrounding environment information of the robot, wherein the additional path is generated while operating the robot based on the one or more move commands; and operating the robot to move along the additional path toward the arrival point.

20. The method according to claim 19, further comprising:

storing a plurality of tasks each including two or more move commands, the two or more move commands each designating a different via point of the predetermined section;

selecting one task from the plurality of stored tasks to form the predetermined section; and calling the auto command before calling the two or more move commands included in the selected one task.

* * * * *